United States Patent
Wong et al.

(10) Patent No.: US 11,749,302 B1
(45) Date of Patent: Sep. 5, 2023

(54) METHOD OF MANUFACTURING HEAD GIMBAL ASSEMBLY, HEAD GIMBAL ASSEMBLY AND HARD DISK DRIVE

(71) Applicant: SAE Magnetics (H.K.) Ltd., Hong Kong (HK)

(72) Inventors: Ka Yip Wong, Hong Kong (HK); Chi Hung Yuen, Hong Kong (HK); Ryo Hosoi, Hong Kong (HK); Seiichi Takayama, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 17/743,443

(22) Filed: May 12, 2022

(51) Int. Cl.
G11B 5/48 (2006.01)
G11B 5/00 (2006.01)

(52) U.S. Cl.
CPC ............ G11B 5/4826 (2013.01); G11B 5/484 (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,538,978 B2* | 5/2009 | Sato | G11B 5/1278 360/128 |
| 8,248,892 B2 | 8/2012 | Shimazawa et al. | |
| 8,533,936 B1* | 9/2013 | Puttichaem | B23K 1/0056 29/603.07 |
| 2004/0228036 A1* | 11/2004 | Yamaguchi | G11B 5/4853 |
| 2005/0067395 A1* | 3/2005 | Shindo | H05K 3/3494 219/121.85 |
| 2005/0195527 A1* | 9/2005 | Yamaguchi | G11B 5/4826 29/603.01 |
| 2006/0006517 A1* | 1/2006 | Lee | H01L 25/0657 257/E23.105 |
| 2006/0193084 A1* | 8/2006 | Satoh | H05K 3/3442 360/234.5 |
| 2007/0012749 A1* | 1/2007 | Yamaguchi | H05K 3/3442 219/121.64 |
| 2007/0102485 A1* | 5/2007 | Fukaya | H05K 3/3494 228/101 |
| 2010/0097724 A1* | 4/2010 | Shimazawa | G11B 5/4833 360/245.4 |

(Continued)

FOREIGN PATENT DOCUMENTS

| JP | 200293092 A | 3/2002 |
|---|---|---|
| JP | 2004283911 A | 10/2004 |

(Continued)

*Primary Examiner* — William J Klimowicz

(57) ABSTRACT

A method of manufacturing a head gimbal assembly includes a head connecting step which a thermally assisted magnetic head is connected to a suspension. The head connecting step includes a solder ball arrangement step which only one solder ball is arranged so that a laser diode of the thermally assisted magnetic head is connected with a flexure of the suspension, in an assembly structure which a slider of the thermally assisted magnetic head is adhered to the suspension. The solder ball arrangement step is performed using a connecting ball, as the solder ball, having a size larger than a wiring gap and being in unmelted-solid condition. The head connecting step includes a heat step which an electrode surface of the laser diode is heated.

6 Claims, 21 Drawing Sheets

(56) References Cited

U.S. PATENT DOCUMENTS

| | | |
|---|---|---|
| 2011/0205661 A1 | 8/2011 | Komura et al. |
| 2012/0008470 A1* | 1/2012 | Shimazawa ............ G11B 5/314 |
| 2012/0044790 A1* | 2/2012 | Shimazawa .......... G11B 5/4853 |
| | | 369/13.32 |
| 2012/0155232 A1 | 6/2012 | Schreck et al. |
| 2015/0154988 A1 | 6/2015 | Takei et al. |
| 2015/0364899 A1 | 12/2015 | Tatah et al. |
| 2015/0380035 A1 | 12/2015 | Takei et al. |

FOREIGN PATENT DOCUMENTS

| | | |
|---|---|---|
| JP | 2006221690 A | 8/2006 |
| JP | 2007310968 A | 11/2007 |
| JP | 2012084216 A | 4/2012 |

\* cited by examiner (A)

(B)

(A)

(B)

METHOD OF MANUFACTURING HEAD GIMBAL ASSEMBLY, HEAD GIMBAL ASSEMBLY AND HARD DISK DRIVE

BACKGROUND

Field of the Invention

The present invention relates to a method of manufacturing a head gimbal assembly having a thermally assisted magnetic head recording data on a magnetic recording medium by thermally assisted magnetic recording using near-field light, the head gimbal assembly and a hard disk drive.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The following structure is conventionally known as the structure.

The structure which the light source is provided on the surface of the slider (for example, US2015-0364899 (also called patent document 2), US2011-0205661 (also called patent document 3), US2015-154988 (also called patent document 4), US 2015-0380035 (also called patent document 5), JP2012-084216 (also called patent document 6)).

Concerning the above-described structure, the slider is mounted on a part which is called suspension, thereby a part, including the slider and the suspension, which is called head gimbal assembly (hereinafter, also referred to as "HGA") is manufactured. The magnetic disk drive is fabricated with the HGA.

SUMMARY OF THE INVENTION

There is a following problem in the conventional head gimbal assembly including the above-described thermally assisted magnetic head. Solder is used in the process of manufacturing the HGA, thereby the problem is caused.

When a laser diode as the light source is provided on the surface of the slider, a member which is called sub-mount is used. For example, the sub-mount 300, as illustrated in FIG. 20, is used.

At this time, a laser diode 310 is joined on a surface 300*a* of the sub-mount 300 to form a light source-unit 360. After that, the sub-mount 300 is joined on a surface 401 of a slider 400.

Then, as illustrated in FIG. 21, when the slider 400 is mounted on a suspension 500, a HGA 700 is manufactured with them, a terminal pad 410 of the slider 400 is electrically connected to the suspension 500. Further, because an electrode 311 is formed on a surface of the laser diode 310, the electrode 311 is also electrically connected to the suspension 500. The terminal pad 410 of the slider 400, the electrode 311 of the laser diode 310 are conventionally connected with solder (respectively solders 600, 610).

Concerning the conventionally HGA, the structure, which electrodes of the slider and laser diode are connected to the suspension with solder, like the HGA 700, for example, is disclosed in JP2004-283911 (also called patent document 7), JP2007-310968 (also called patent document 8), JP2002-93092 (also called patent document 9), JP2006-221690 (also called patent document 10), U.S. Pat. No. 8,248,892 (also called patent document 11) and so on.

However, when the HGA 700 is manufactured, the solder 600 needs to be connected to both the slider 400 and the suspension 500. The solder 610 also needs to be connected to both the laser diode 310 and the suspension 500. Furthermore, because the solders 600, 610 are connected in melting condition, they have surface tension. Therefore, stress (tensile stress), in accordance with surface tension of the solders 600, 610, is caused in the parts which the solders 600, 610 (electrode pads 500*a*, 500*b* of the suspension 500, an electrode pad 410 of the slider 400, the electrode 311 of the laser diode 310) touch.

Then, after the solders 600, 610 hardened, the stress remains in connection parts 601, 602, 603, 604 as mechanical stress. The mechanical stress makes the connection condition of the solders 600, 610 unstable. Therefore, it is difficult that stability of the connection condition is improved in the conventional HGA.

Especially, the conventional HGA, including the thermally assisted magnetic head, like the HGA 700, includes many connected parts with solder, because of including the laser diode 310, thereby mechanical stress is likely to remain.

Besides, the conventional HGA, like the HGA 700, the solders 600, 610 are widely connected to the whole of the electrode pads 500*a*, 500*b* and the electrode pad 410. Therefore, parts, which are affected by surface tension, widely exist, thereby stress, originated in surface tension, is likely to be enlarged, mechanical stress is likely to be enlarged. Therefore, in the conventional HGA, like the HGA 700, it is extremely difficult that stability of the connection condition is improved.

Hence the present invention is made to solve the above problem, and it is an object to provide a method of manufacturing the head gimbal assembly, which is able to improve the connection condition, in the head gimbal assembly being manufactured with solder, a head gimbal assembly and hard disk drive which is manufactured according to the method of manufacturing.

To solve the above problem, the present invention provides a method of manufacturing a head gimbal assembly having a thermally assisted magnetic head and a suspension including: a head connecting step which the thermally assisted magnetic head is connected to the suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head connecting step includes a solder ball arrangement step which only one solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension; the solder ball arrangement step is performed using a connecting ball, as the solder ball, having a size larger than a wiring gap between an electrode surface of the laser diode and a wiring end part, of the flexure, which is closest to the electrode surface and being in unmelted-solid condition, and the solder ball arrangement step is performed so that the connecting ball is in contact with the electrode surface and the flexure; the head connecting step comprises a heat step which the electrode surface is heated.

In case of the above-described method of manufacturing a head gimbal assembly, it is possible that the heat step is performed as a preliminary heat step which the electrode surface is preliminarily heated before performing the solder ball arrangement step so that the connecting ball is heated at the timing of being in contact with the electrode surface.

Further, in the above-described method of manufacturing a head gimbal assembly, it is possible that the head connecting step further comprises a connecting ball attaching step which the connecting ball is attached to the electrode surface and the flexure, after the connecting ball is in contact with the electrode surface and the flexure; the connecting ball attaching step is performed by irradiation of laser light to the connecting ball so that temperature of the connecting ball reaches a melting temperature of a solder from a middle temperature, which preliminarily reaches by heating of the connecting ball because of contact with the electrode surface.

Further, it is possible that the solder ball arrangement step is performed so that the whole of the connecting ball is arranged in the position which is near the electrode surface than a gap line which connects an electrode end part, of the electrode surface, being nearest to the wiring end part with the wiring end part.

Further, in the above-described method of manufacturing a head gimbal assembly, it is possible that the suspension includes a load beam which forms the light-source unit surface; the flexure includes a wiring member which forms the slider arrangement surface; the wiring member includes an exposed wiring surface which is exposed in the opening part; the connecting ball attaching step is performed so that the connecting ball is attached to the electrode surface and the exposed wiring surface.

Further, it is possible that the suspension includes a load beam which forms the light-source unit surface; the flexure includes a wiring member which forms the slider arrangement surface; the wiring member includes an exposed wiring surface which is exposed in the opening part; the solder ball arrangement step is performed so that the connecting ball is in contact with the electrode surface and the wiring end part; the connecting ball attaching step is performed so that the connecting ball is attached to the wiring end part in addition to the electrode surface and the exposed wiring surface.

Then, the present invention provides a head gimbal assembly having a thermally assisted magnetic head and a suspension including: a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the suspension includes a load beam which forms the light-source unit surface; the flexure includes a wiring member which forms the slider arrangement surface; the wiring member includes an exposed wiring surface which is exposed in the opening part; the solder connector includes a first attaching area and a second attaching area; the first attaching area is attached to the exposed wiring surface and the second attaching area is attached to an electrode surface of the laser diode, and the second attaching area is larger than the first attaching area.

Further, it is preferable that the solder connector includes an extending part which extends outside than a wiring end part, of the flexure, being nearest to the electrode surface.

Further, it is possible that the solder connector further includes a curved surface part which connect the electrode surface with the exposed wiring surface, and being formed in smooth curved, not including convex parts and concave parts, and formed in the descent slanting shape from the electrode surface to the exposed wiring surface.

Further, it is possible that the extending part includes a curved surface part which connect the electrode surface with the wiring end part, and being formed in smooth curved, not including convex parts and concave parts, and formed in descent slanting shape from the electrode surface to the wiring end part.

Further, it is possible that the whole of the connecting ball, including the extending part, is arranged in the position which is near the electrode surface than a gap line which connects the wiring end part with an electrode end part, of the electrode surface, being nearest to the wiring end part.

Then, the present invention provides a hard disk drive including a head gimbal assembly and a magnetic recording medium, the head gimbal assembly includes a thermally assisted magnetic head and a suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the suspension includes a load beam which forms the light-source unit surface; the flexure includes a wiring member which forms the slider arrangement surface; the wiring member includes an exposed wiring surface which is exposed in the opening part; the solder connector includes a first attaching area and a second attaching area; the first attaching area is attached to the exposed wiring surface and the second attaching area is attached to an electrode surface of the laser diode, and the second attaching area is larger than the first attaching area.

In the above-described hard disk drive, it is preferable that the solder connector includes an extending part which extends outside than a wiring end part, of the flexure, being nearest to the electrode surface.

Further, it is preferable that the whole of the connecting ball, including the extending part, is arranged in the position which is near the electrode surface than a gap line which connects the wiring end part with an electrode end part, of the electrode surface, being nearest to the wiring end part.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of a Head Gimbal Assembly)

Figure 2:
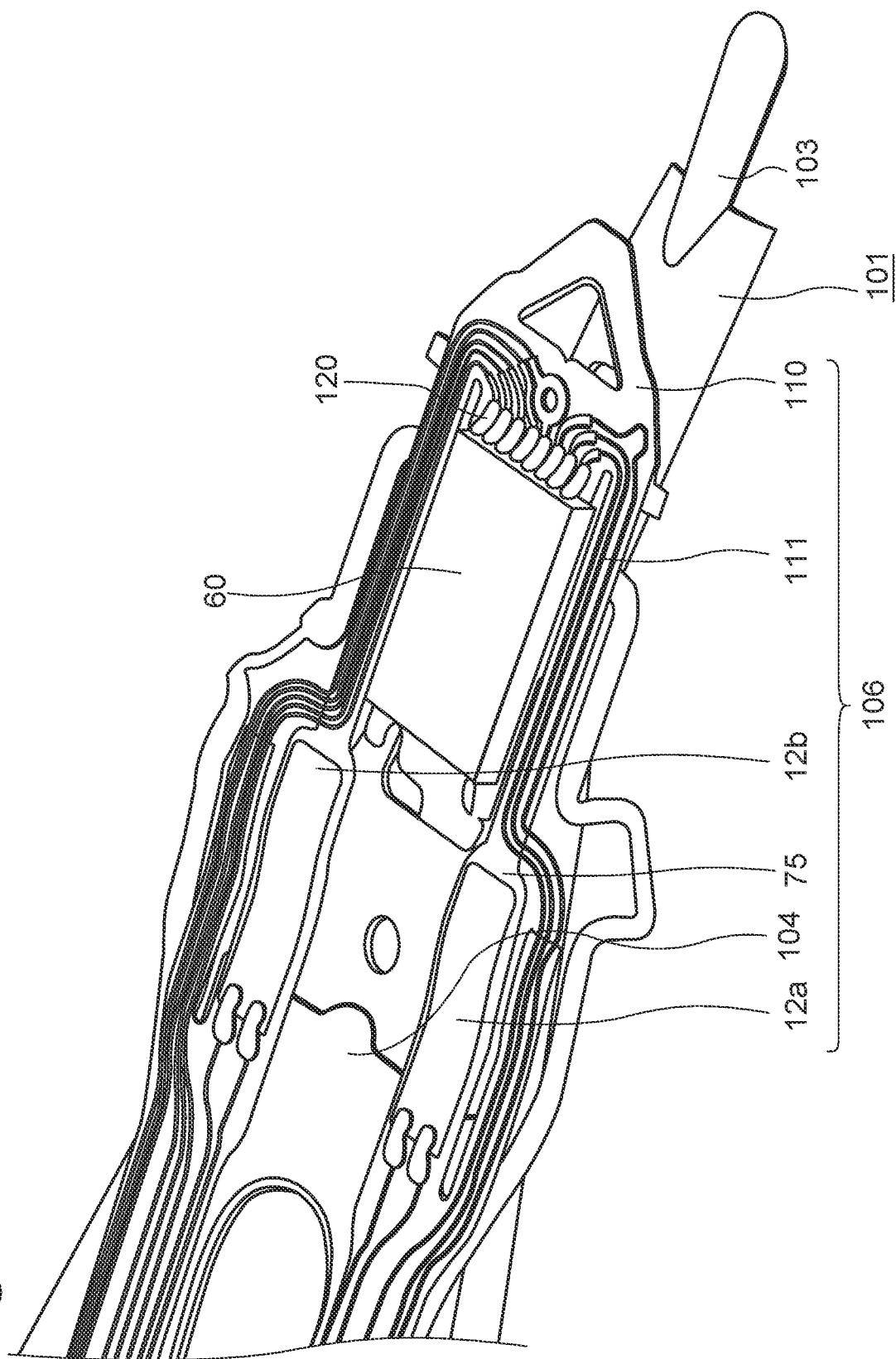
FIG. 2 is a perspective view, seen from the front side, of a principal part of the HGA, in FIG. 1.
Figure 3:
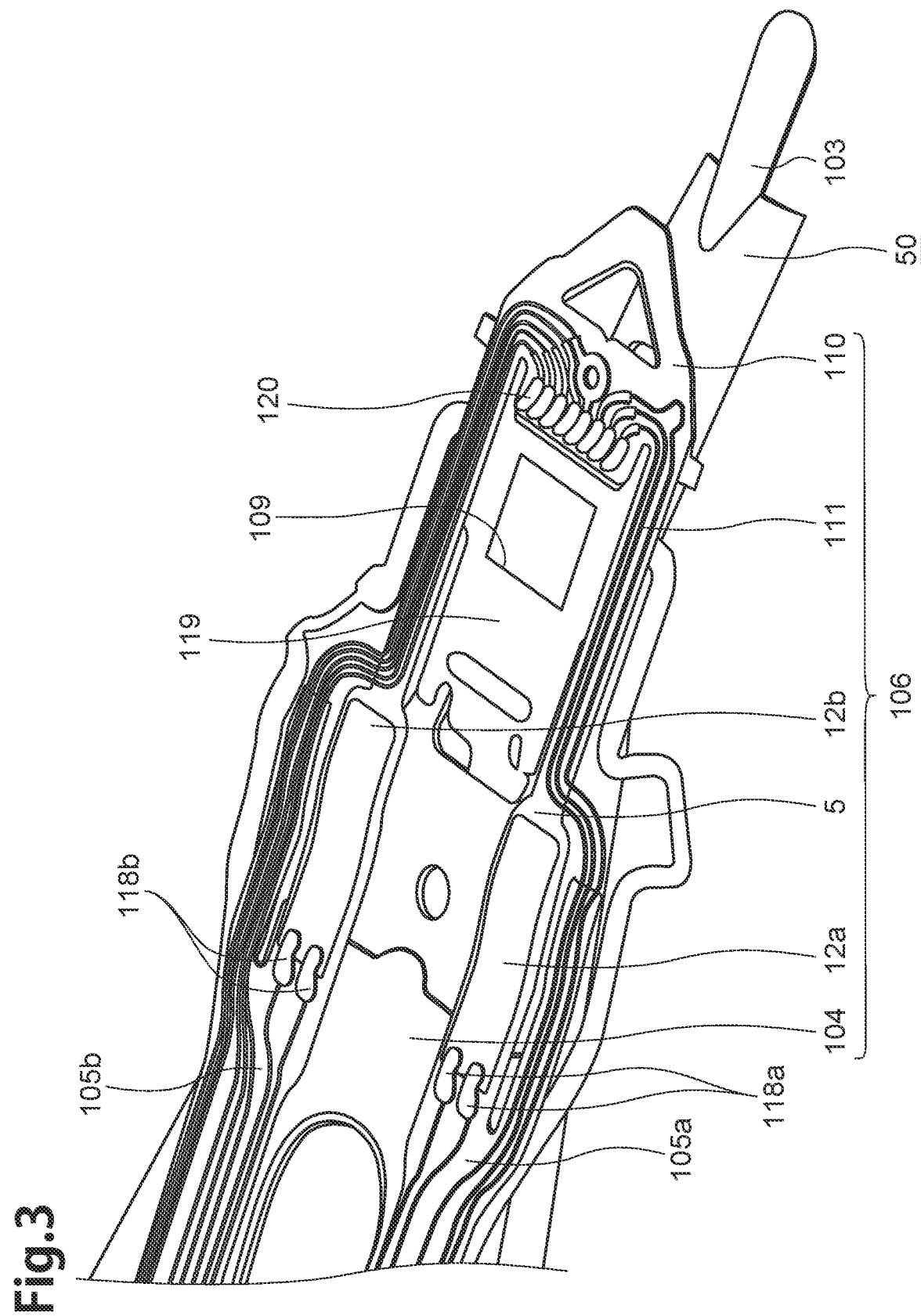
FIG. 3 is a perspective view, seen from the front side, of the principal part of the suspension constituting the HGA, in FIG. 1.

To begin with, structure of a Head Gimbal Assembly 101 which is manufactured with the method of manufacturing according to the embodiment of the present invention will be explained with reference to FIG. 1 to FIG. 9. Here, FIG. 1 to FIG. 8 are views showing the HGA 101, which is manufactured with the method of manufacturing according to the embodiment of the present invention, FIG. 1 is a perspective view of the whole HGA 101, seen from the front side, FIG. 2 is a perspective view, seen from the front side, of a principal part of the HGA 101, FIG. 3 is a perspective view, seen from the front side, of a principal part of a suspension 50 constituting the HGA 101.

Figure 4:
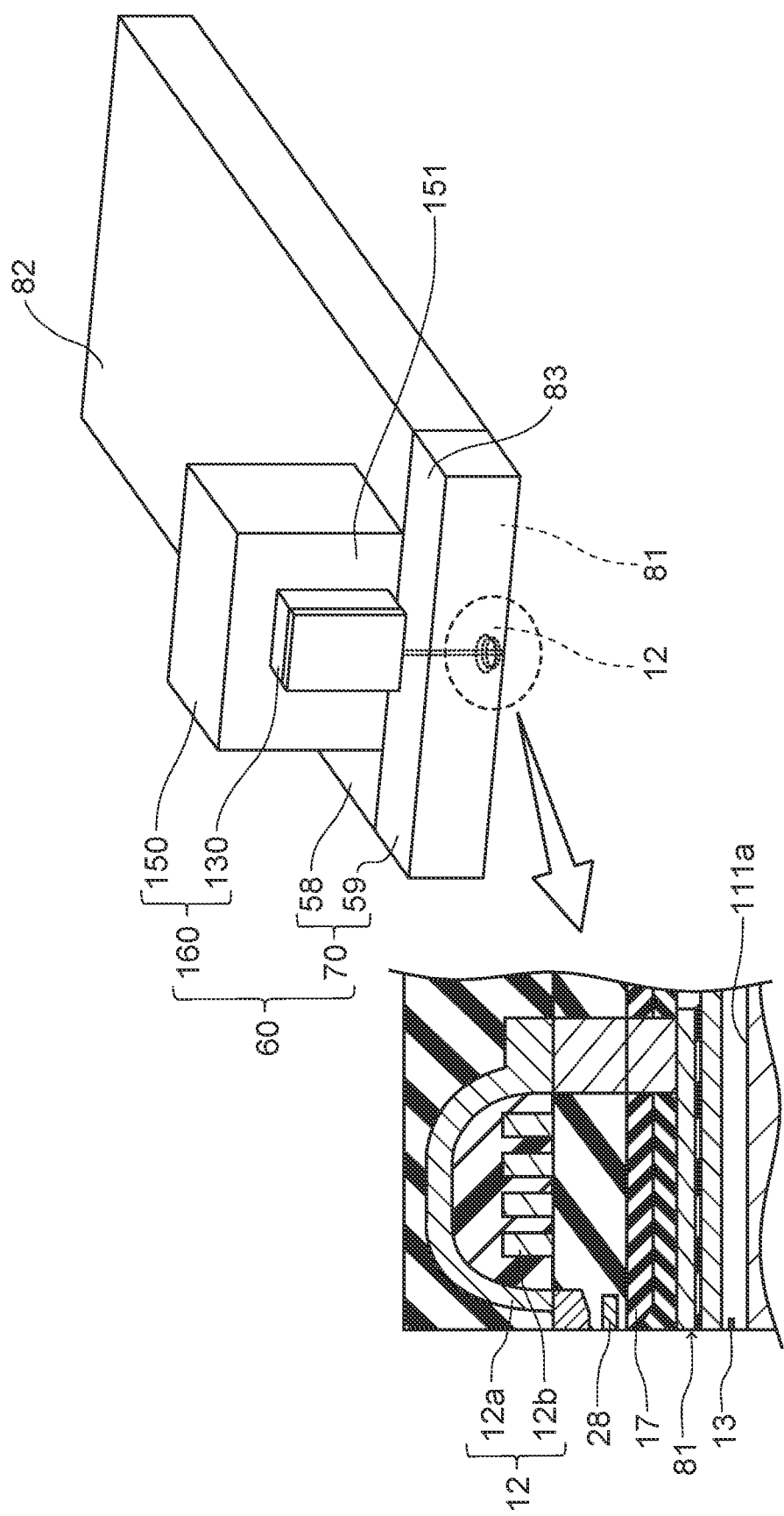
FIG. 4 is a perspective view of the thermally assisted magnetic head constituting the HGA, in FIG. 1.
Figure 5:
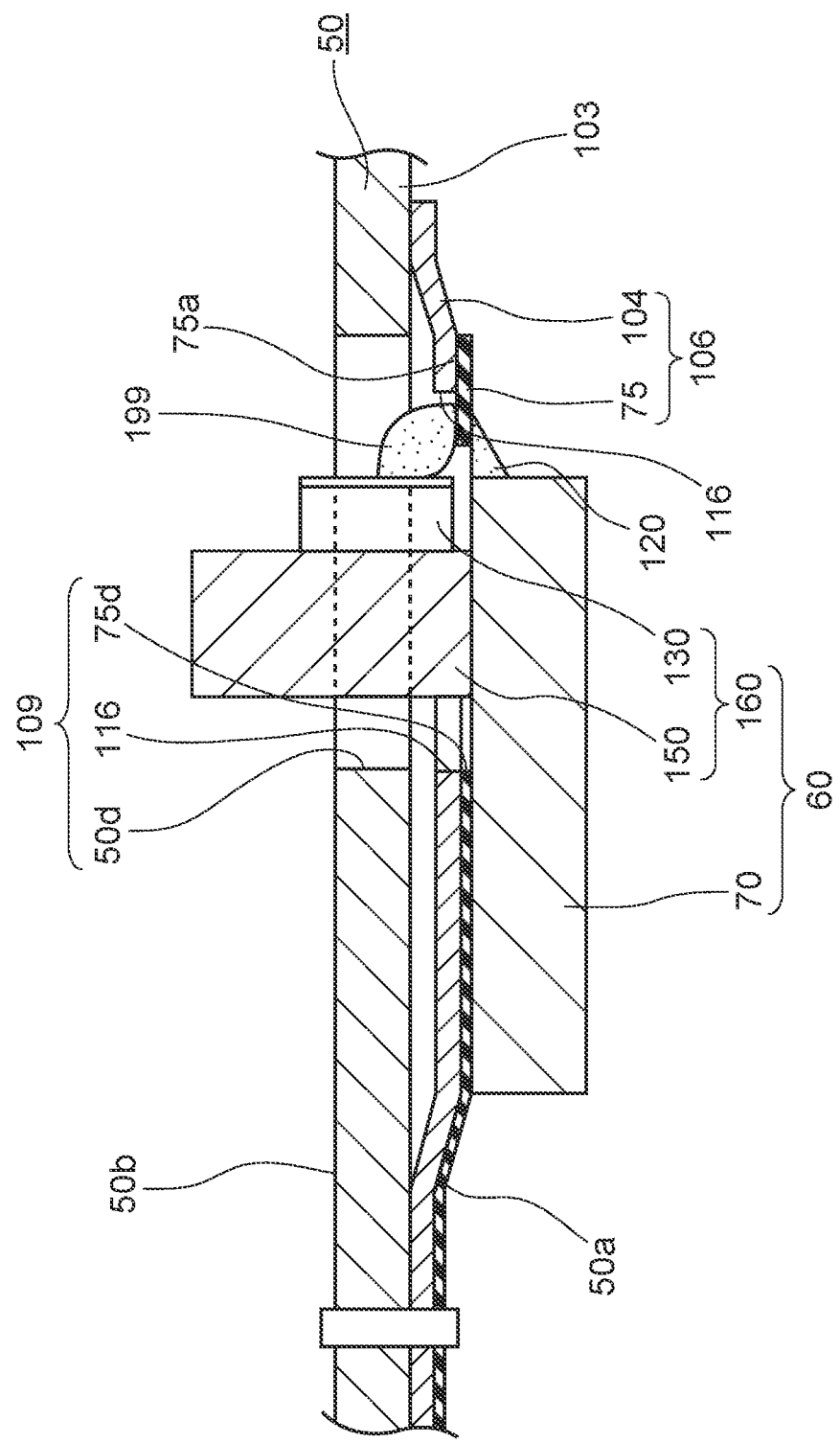
FIG. 5 is a sectional view of a principal part, of the HGA in FIG. 1, which is along with the length direction.
Figure 6:
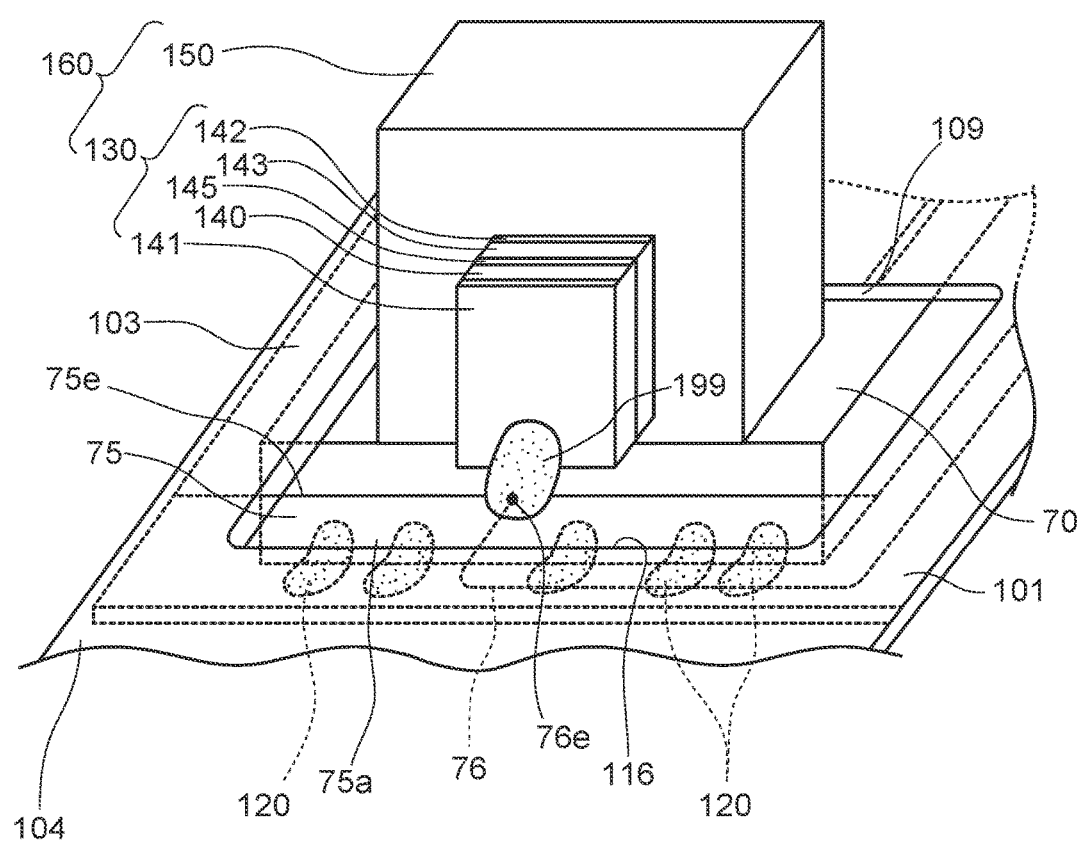
FIG. 6 is a perspective view, seen from the rear side, showing the principal part of the HGA in FIG. 1.
Figure 7:
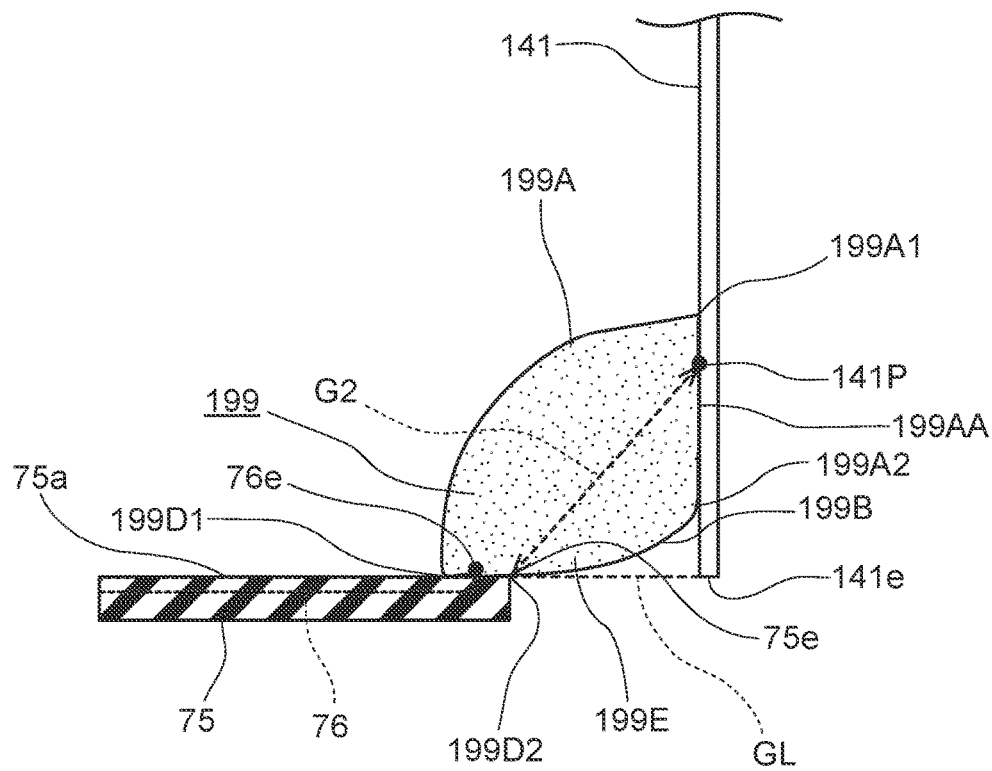
FIG. 7(A) is a side view showing a solder connecter which is included in the HGA in FIG. 1 and peripheral members.
FIG. 7(B) is a side view, partially omitted, showing the solder connecter which is included in the HGA in FIG. 1 and peripheral members.
Figure 7:
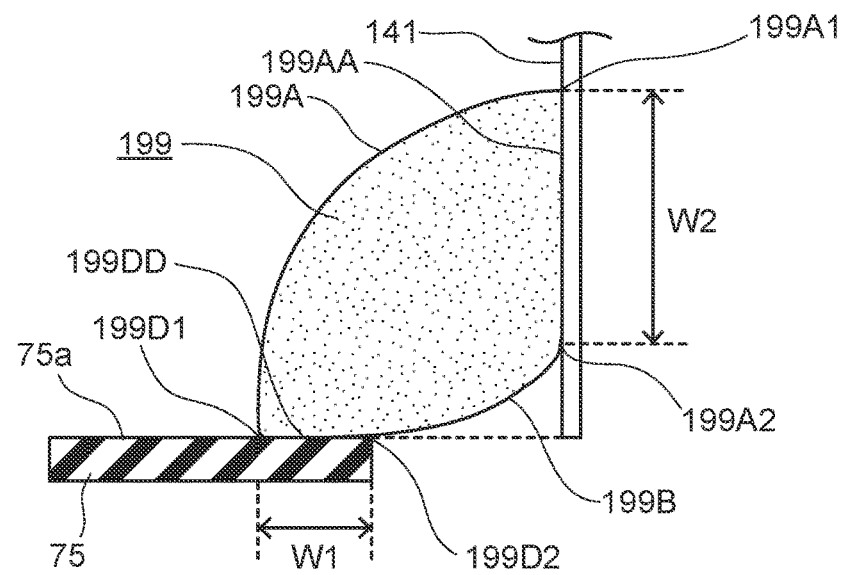
Figure 8:
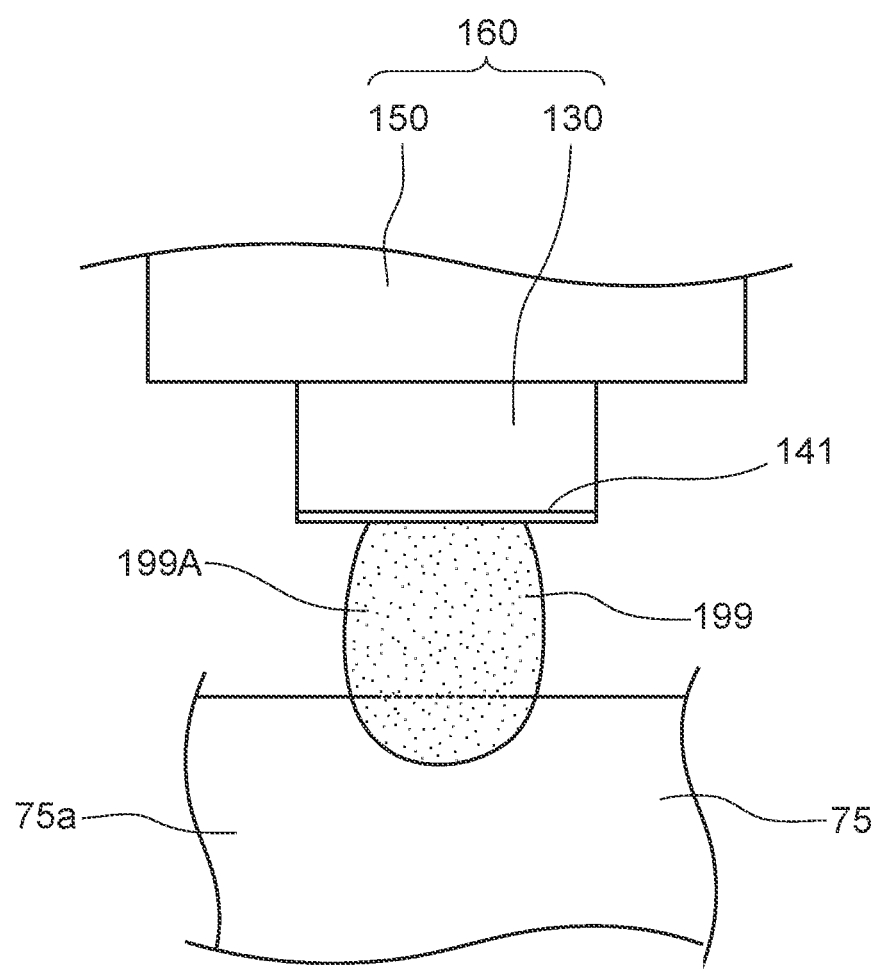
FIG. 8 is a plan view showing the solder connecter which is included in the HGA in FIG. 1 and peripheral members.
Figure 9:
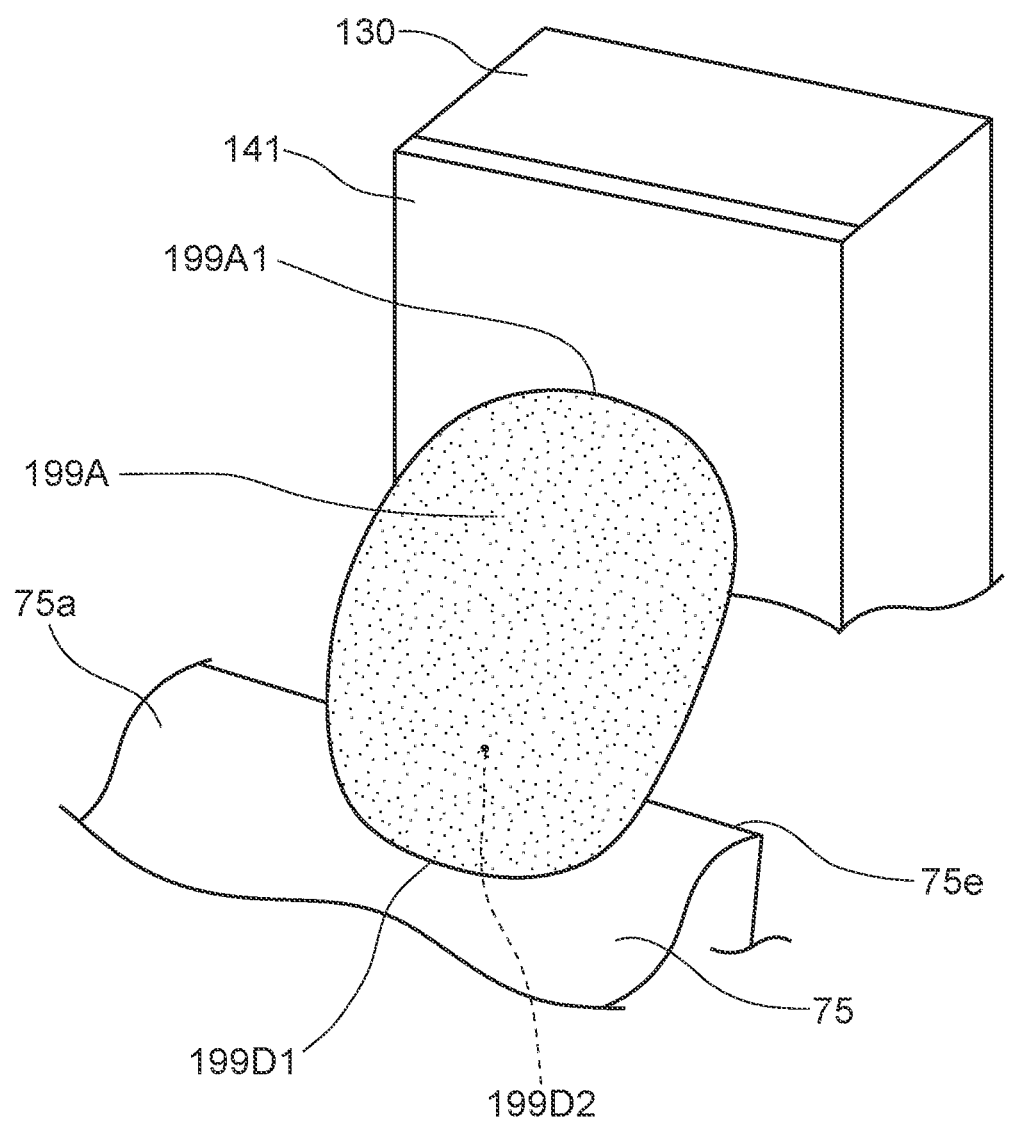
FIG. 9 is a perspective view, partially omitted, showing the solder connecter which is included in the HGA in FIG. 1 and peripheral members.

Further, FIG. 4 is a perspective view of a thermally assisted magnetic head 60 constituting the HGA 101, FIG. 5 is a sectional view of a principal part, of the HGA 101, which is along with the length direction, FIG. 6 is a perspective view, seen from the rear side, showing the principal part of the HGA 101. Further, FIG. 7 is a side view showing a solder connecter 199 which is included in the HGA 101 and peripheral members, FIG. 8 is a plan view showing the solder connecter 199 and peripheral members. FIG. 9 is a perspective view, partially omitted, showing the solder connecter 199 and peripheral members.

Figure 1:
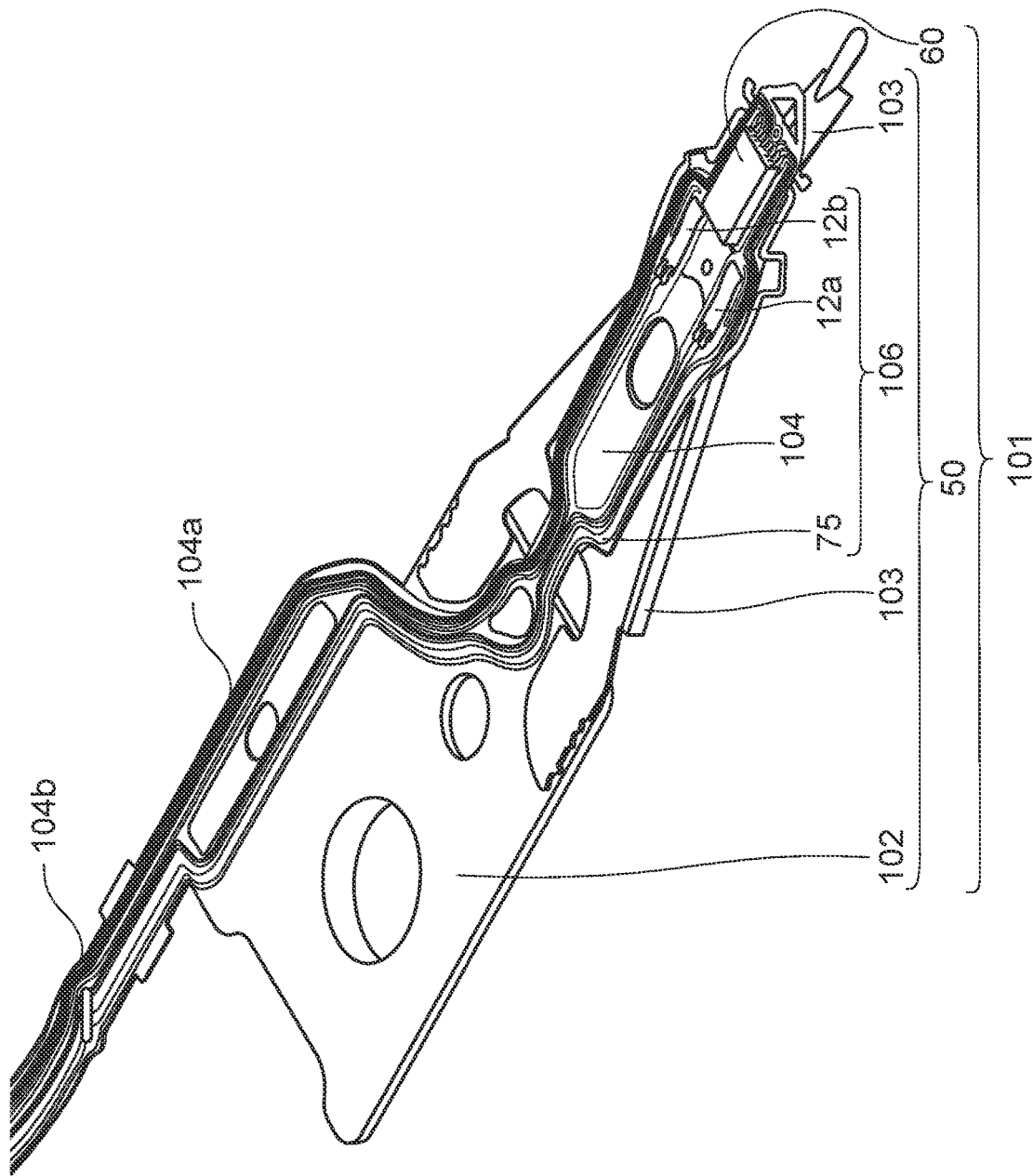
FIG. 1 is a perspective view of a whole HGA, seen from front side, which is manufactured by a method of manufacturing according to an embodiment of the present invention.

As illustrated in FIG. 1, the HGA 101 has the suspension 50 and the thermally assisted magnetic head 60. The suspension 50 has a base plate 102, a load beam 103, a flexure 106 and a damper not illustrated, and it has a structure which these parts are joined to be united one body by a weld and so on.

The base plate 102 is a part which is used to fix the suspension 50 to drive arms 209 of a later-described hard disk drive 201, and it is formed with a metal such as stainless steel or the like.

The load beam 103 is fixed on the base plate 102. The load beam 103 has a shape in which the width gradually decreases as it is distanced more from the base plate 102. The load beam 103 has a load bending part which generates a power for pressing the thermally assisted magnetic head 60 against the hard disk 202 of the hard disk drive 201.

Further, as illustrated in FIG. 2, the flexure 106 has a flexure substrate 104, a wiring member 75, a connecting wiring 111 and thin-film piezoelectric material elements 12a, 12b. The flexure 106 has a structure which the wiring member 75 is formed on the flexure substrate 104, the connecting wiring 111 and thin-film piezoelectric material elements 12a, 12b are adhered on the wiring member 75. Further, a not-illustrated protective insulating layer is formed so as to cover the connecting wiring 111 and thin-film piezoelectric material elements 12a, 12b.

The flexure 106 has piezoelectric elements attached structure which thin-film piezoelectric material elements 12a, 12b are fixed on the surface of the wiring member 75 in addition to the connecting wiring 111 to become a structure with piezoelectric element.

Further, the flexure 106 has a gimbal part 110 on the tip side (load beam 103 side). A tongue part 119, which the thermally assisted magnetic head 60 is mounted, is secured on the gimbal part 110 (see FIG. 3), and a plurality of connecting pads 120 are formed near an edge side than the tongue part 119. Connecting pads 120 are electrically connected to not-illustrated electrode pads of the thermally assisted magnetic head 60, and the connecting pads 120 are formed with solder.

This flexure 106 expands or shrinks thin-film piezoelectric material elements 12a, 12b and expands or shrinks stainless part (referred to out trigger part) jut out outside of the tongue part 119. That makes a position of the thermally assisted magnetic head 60 move very slightly around not-illustrated dimple, and a position of the thermally assisted magnetic head 60 is controlled minutely.

The flexure substrate 104 is a substrate for supporting a whole of the flexure 106, and it is formed with stainless steel. Rear side of the flexure substrate 104 is fixed to the base plate 102 and the load beam 103 by weld (see FIG. 3, concerning the load beam 103). As illustrated in FIG. 1, the flexure substrate 104 has a center part 104a fixed to surfaces of the load beam 103 and the base plate 102, and a wiring part 104b extending to outside from the base plate 102.

As illustrated in FIG. 5, the wiring member 75 covers surface of the flexure substrate 104. The wiring member 75 forms a later-described slider arrangement surface 50a, of the HGA 101, according to this invention. The wiring member 75 is formed with for example polyimide, and it has a thickness of about 5 µm to 10 µm. Further, as illustrated in detail in FIG. 3, a part of the wiring member 75, disposed on the load beam 103, is divided two parts. One part of them is a first wiring part 105a, the other part of them is a second wiring part 105b. The thin-film piezoelectric material elements 12a and thin-film piezoelectric material element 12b are adhered on surfaces of each wiring part. The thin-film piezoelectric material element 12a, 12b are connected to the electrode pads 118a, 118b. The electrode pads 118a, 118b are connected to the connecting wiring 111.

Further, as illustrated in FIG. 5, FIG. 6, the wiring member 75 has an exposed wiring surface 75a which is exposed inside a later-described opening part 109. A connecting pad 76e of an electrode wiring 76, included in the connecting wiring 111, is provided on the exposed wiring surface 75a. A later-described solder connector 199 is connected to the connecting pad 76e. Further a plurality of connecting pads 120 are formed on the slider arrangement surface 50a of the wiring member 75. The connecting pads 120 are connected to the connecting wiring 111.

As illustrated in FIG. 3, a plurality of connecting wirings 111 are formed on surfaces of each of the first wiring part 105a and the second wiring part 105b. Each connecting wiring 111 is formed with conductor such as copper or the like. One end parts of each connecting wiring 111 are connected to the electrode pads 118a, 118b or each connecting pad 20. The electrode wiring 76 of the connecting wiring 111 is connected to the solder connector 199.

Then, illustrated in FIG. 5, the suspension 50 includes the slider arrangement surface 50a and a light-source unit surface 50b. The slider arrangement surface 50a is a surface of the side which a later-described slider 70, of the thermally assisted magnetic head 60, is arranged. The slider arrangement surface 50a is formed with an outside surface of the above-described wiring member 75. The slider 70 is adhered on the slider arrangement surface 50a.

Further, the suspension 50 includes the opening part 109. The opening part 109 is a hole part which penetrates from the slider arrangement surface 50a to the light-source unit surface 50b, and it is formed by overlapping of an opening part 75d, an opening part 116, opening part 50d. The opening part 75d, the opening part 116, the opening part 50d are respectively the opening part of the wiring member 75, the opening part of the flexure substrate 104, the opening part of the load beam 103 (note that the load beam 103 is omitted in FIG. 6, for convenience of illustration).

Then, the HGA 101 includes an assembly structure. As illustrated in FIG. 5, FIG. 6, the assembly structure is a structure which is constituted by the suspension 50 and the thermally assisted magnetic head 60.

As later described in detail, the thermally assisted magnetic head 60 includes the slider 70 and the light-source unit 160. In the HGA 101, concerning the suspension 50 and the thermally assisted magnetic head 60, the light-source unit 160 is inserted in the opening part 109 from the slider arrangement surface 50a and the light-source unit 160 is protruded from the light-source unit surface 50b. Moreover, the slider 70 is adhered on the slider arrangement surface 50a of the suspension 50. The structure, which is constituted by the suspension 50 and the thermally assisted magnetic head 60, is the assembly structure.

Further, the HGA 101 includes the solder connector 199. The solder connector 199 is explained in detail as follows.

(Solder Connector)

As illustrated in FIG. 5 to FIG. 7, the solder connector 199 is connected to a n-electrode 141 of a later-described laser diode 130 and the connecting pad 76e of the electrode wiring 76. The connecting pad 76e is provided on the exposed wiring surface 75a, and the n-electrode 141 is arranged so as to face the connecting pad 76e. The n-electrode 141 is connected to the connecting pad 76e with the solder connector 199.

The solder connector 199 includes a first curved surface part 199A and a second curved surface part 199B. As illustrated in FIG. 7, FIG. 9 in detail, the first curved surface part 199A is a curved surface which connects the n-electrode 141 with the exposed wiring surface 75a. The first curved surface part 199A is a smoothly curved surface, which does not include convex parts and concave parts, and is formed in the descent slanting shape from the n-electrode 141 to the exposed wiring surface 75a. The second curved surface part 199B is provided in a later-described extending part 199E. The second curved surface part 199B is a curved surface which connects the n-electrode 141 with a later-described wiring end part 75e of the wiring member 75. The second curved surface part 199B is a smoothly curved surface, which does not include convex parts and concave parts, and is formed in the descent slanting shape from the n-electrode 141 to the wiring end part 75e. The wiring end part 75e is a part, of the wiring member 75, which is closest to the n-electrode 141, it is corresponding to a corner part, of the wiring member 75, arranged on the side of the n-electrode 141.

Both the first curved surface part 199A and the second curved surface part 199B are smoothly curved surfaces, not including convex parts and concave parts. A curved surface which connects a first connecting end part 199A1, being in touch with the n-electrode 141, to a first connecting end part 199D1, being in touch with the exposed wiring surface 75a is corresponding to the first curved surface part 199A. A curved surface which connects a second connecting end part 199A2, being in touch with the n-electrode 141, to the wiring end part 75e is corresponding to the second curved surface part 199B.

A part, from the first connecting end part 199A1 to the second connecting end part 199A2, is a connection part 199AA. The connection part 199AA is connected with the connecting point 141P of the n-electrode 141.

A part, of the second curved surface part 199B, which is connected with the wiring end part 75e is a second connecting end part 199D2, and a part, from the second connecting end part 199A2 to the second connecting end part 199D2 is corresponding to the second curved surface part 199B.

Further, a part, from the second connecting end part 199D2 to the first connecting end part 199D1, is a connection part 199DD, the connection part 199DD is connected with the exposed wiring surface 75a. A part, from the second connecting end part 199D2 to the second connecting end part 199A2, is corresponding to the extending part 199E, which extends outside than the wiring end part 75e. Furthermore, as illustrated in FIG. 7(A), the whole of the solder connector 199 is arranged in the nearer position to the n-electrode 141 than a later-described gap line GL. Further, as illustrated in FIG. 7(B), in the solder connector 199, the size of the connection part 199AA (a second attaching area) is larger than the size of the connection part 199DD (a first attaching area). The distance between the first, second connecting end parts 199A1, A2 (a second attaching distance) W2 is larger than the distance between the first, second connecting end parts 199D1, D2 (first attaching distance) W1 (W1<W2).

Then, because the HGA 101 is manufactured in accordance with the method of manufacturing according to the embodiment of the present invention, the solder connector 199 includes the above-described structure. The method of manufacturing is explained later.

(Structure of the Thermally Assisted Magnetic Head)

As illustrated in FIG. 4, the thermally assisted magnetic head 60 has a slider 70 and a light source-unit 160. The thermally assisted magnetic head 60 has a structure which the light source-unit 160 is joined to the slider 70.

The slider 70 has a slider-substrate 58 and a magnetic head part 59 formed on the slider-substrate 58.

The slider-substrate 58 is made of a ceramic material such as aluminum oxide-titanium carbide ($Al_2O_3 \cdot TiC$) or the like, and it is formed in a rectangular parallelepiped shape. The slider-substrate 58 has a medium opposing surface (Air Bearing Surface, which will hereinafter be referred also to as "ABS") 81 opposing to the magnetic recording medium, a light source placing surface 82, arranged in the rear side of the ABS 81. A part, of the light source placing surface 82, near the magnetic head part 59, is a light source-opposing surface 83. The light source-opposing surface 83 opposes to a later-described laser diode 130 of the light source-unit 160.

The magnetic head part 59 has an electromagnetic coil element 12 which is a recording head for recording magnetic data and a MR device 13 which is a reproducing head for detecting a magnetic signal. The magnetic head part 59 has a structure which the reproducing head and the recording head are stacked. Further, the magnetic head part 59 has a core layer 17 and a near-field light generating layer 28.

The MR device 13 is constituted by a magnetosensitive film exhibiting a magnetoresistive effect, such as AMR (anisotropic magnetoresistive), GMR (giant magnetoresistive), and TMR (tunneling magnetoresistive) devices.

The electromagnetic coil element 12 has a plurality of layers, which is laminated on a thin-film laminated surface 111a, including a recording magnetic layer 12a and a thin-film coil 12b. The thin-film coil 12b is wound like a flat spiral about the recording magnetic layer 12a.

Then, in the electromagnetic coil element 12, when a current, modulated according to magnetic data to be recorded on the magnetic recording medium, flows through the thin-film coil 12b, the current causes the thin-film coil 12b to generate a recording magnetic field. Further, magnetic flux, in accordance with magnetic field, is emitted from the recording magnetic layer 12a to the magnetic recording medium, the magnetic flux flows back to a not-illustrated return magnetic pole layer via the magnetic recording medium (a not-illustrated soft magnetic layer in detail).

The core layer 17 is a wave guide which guides laser light, generated by the later-described laser diode 130 of the light source-unit 160, from the light source-opposing surface 83 to the ABS 81.

The core layer 17 is formed with dielectric such as tantalum oxide (TaOx) or the like. For example, the core layer 17 is able to be formed with $Ta_2O_5$ (for example, the refractive index is about 2.16).

The near-field light generating layer 28 generates near-field light for heating the magnetic recording medium. The near-field light generating layer 28 is made of metal and formed of, for example, one of Au, Ag, Al, Cu, Pd, Pt, Rh, Ir or an alloy made of a plurality of those elements.

(Light Source-Unit)

The light source-unit 160 has the laser diode 130 and a sub-mount 150. The laser diode 130 is joined to the sub-mount 150 to constitute the light source-unit 160.

As illustrated in FIG. 6, the laser diode 130 has an n-substrate 140, an n-electrode 141, a light emitting layer 145, and a p-electrode 142, and has a rectangle parallelepiped shape. The n-electrode 141 is joined to a surface on the outside of the n-substrate 140. Further, the light emitting layer 145 is formed on a side of the n-substrate 140 opposite to the n-electrode 141, and the p-electrode 142 is joined on the light emitting layer 145, via a ground layer 143.

The light emitting layer 145 has an active layer, an n-cladding layer, and a p-cladding layer, and has a structure in which the active layer is sandwiched between the n-cladding layer and the p-cladding layer.

Then, the laser diode 130 is joined to the sub-mount 150 so that the active layer opposes to the core layer 17, and a not-illustrated emitting part is arranged in a part, of the light emitting layer 145, opposing to the core layer 17. The emitting part is a part, of the laser diode 130, which emits the laser light.

The sub-mount 150 is made of a ceramic material such as aluminum oxide-titanium carbide ($Al_2O_3$·TiC) or the like, and it is formed in a rectangular parallelepiped shape. The sub-mount 150 has a size larger than the laser diode 130. Further, the sub-mount 150 is able to be formed with semiconductor material such as Si, GaAs, SiC or the like.

As illustrated in FIG. 4, the sub-mount 150 of the light source-unit 160, having the above-described structure, is joined to the slider 70 to constitute the thermally assisted magnetic head 60.

(Method of Manufacturing the Head Gimbal Assembly)

Figure 10:
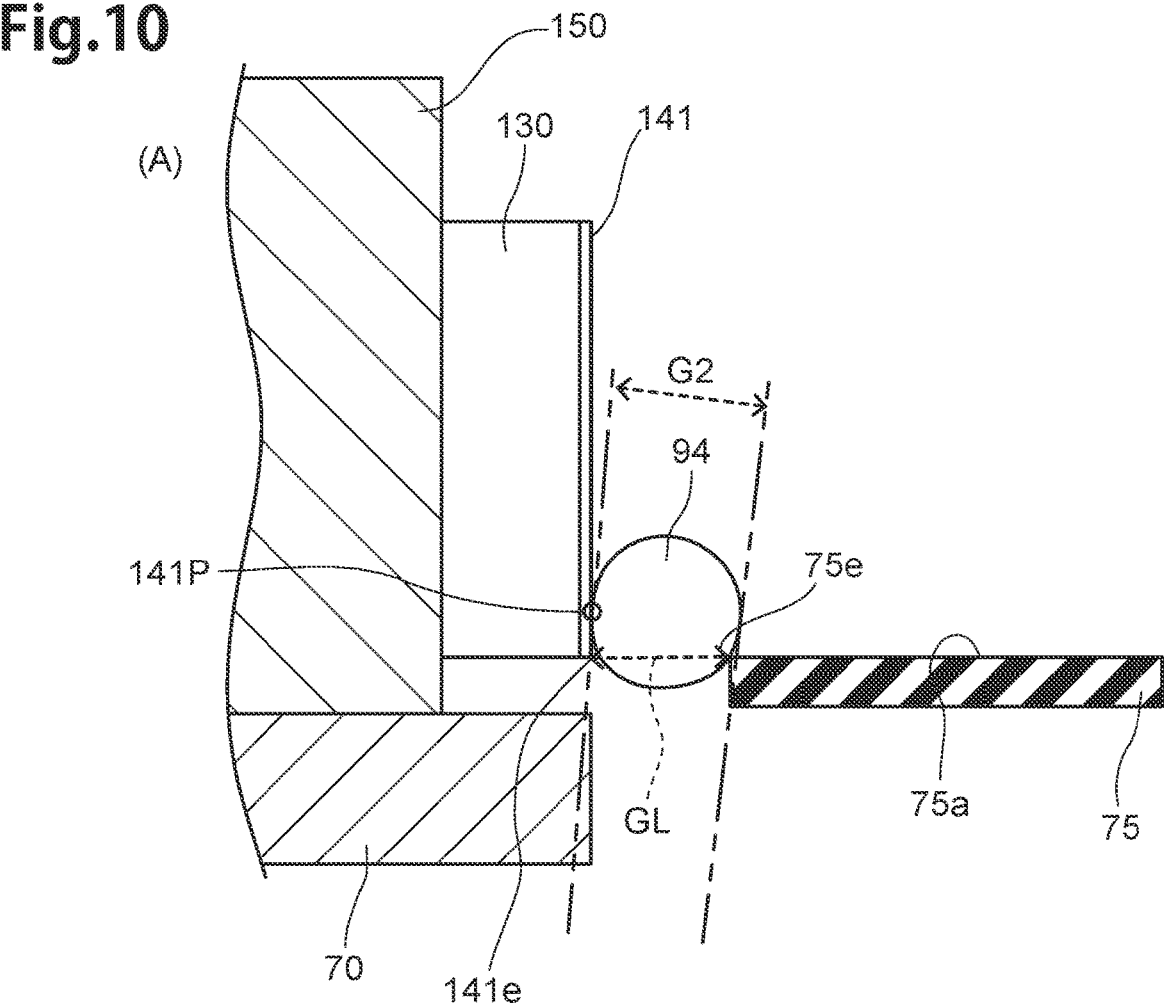
FIG. 10(A) is a sectional view showing a principal part of the HGA, when a solder ball arrangement step of the method of manufacturing, according to the embodiment of the present invention, is performed.
FIG. 10(B) is a sectional view showing a principal part of the HGA, before the solder ball arrangement step is performed.
Figure 10:
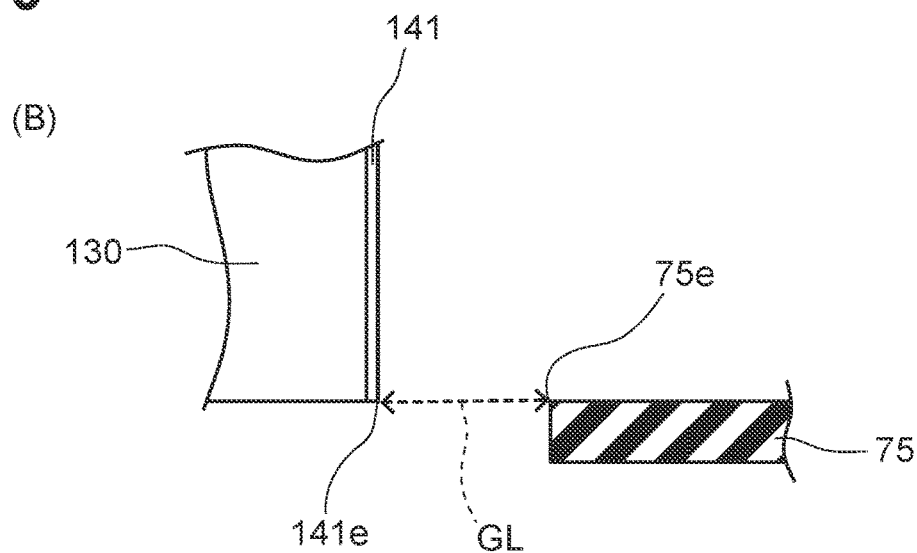
Figure 11:
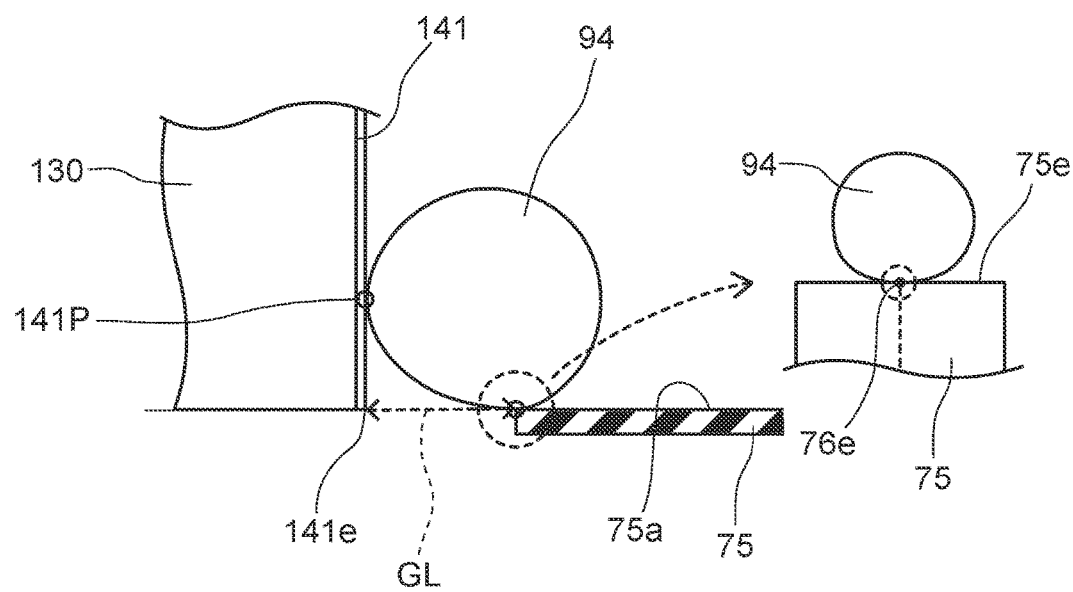
FIG. 11 is a sectional view showing a principal part, when the solder ball arrangement step of the method of manufacturing, according to the embodiment of the present invention, is performed.
Figure 12:
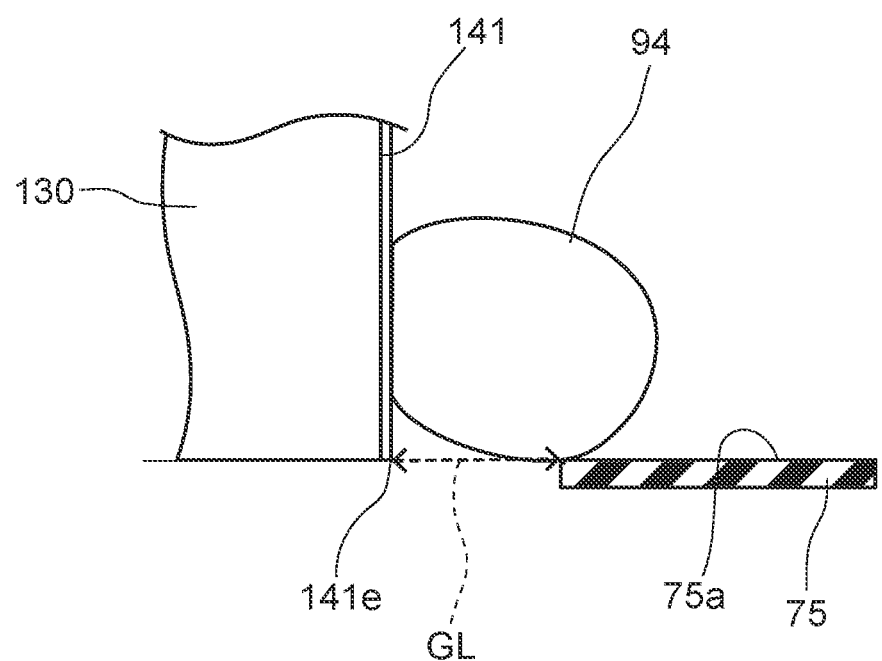
FIG. 12 is a sectional view showing a principal part when a connecting ball attaching step of the method of manufacturing, according to the embodiment of the present invention, is performed, and the connecting ball is partially melted.
Figure 13:
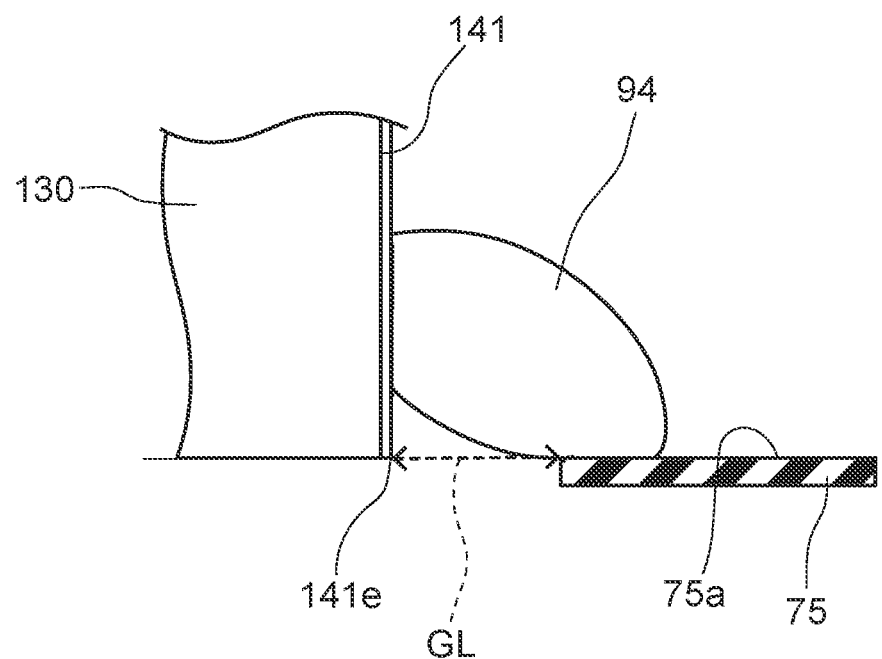
FIG. 13 is a sectional view showing a principal part when the connecting ball attaching step of the method of manufacturing, according to the embodiment of the present invention, is performed, and the connecting ball is wholly melted.
Figure 14:
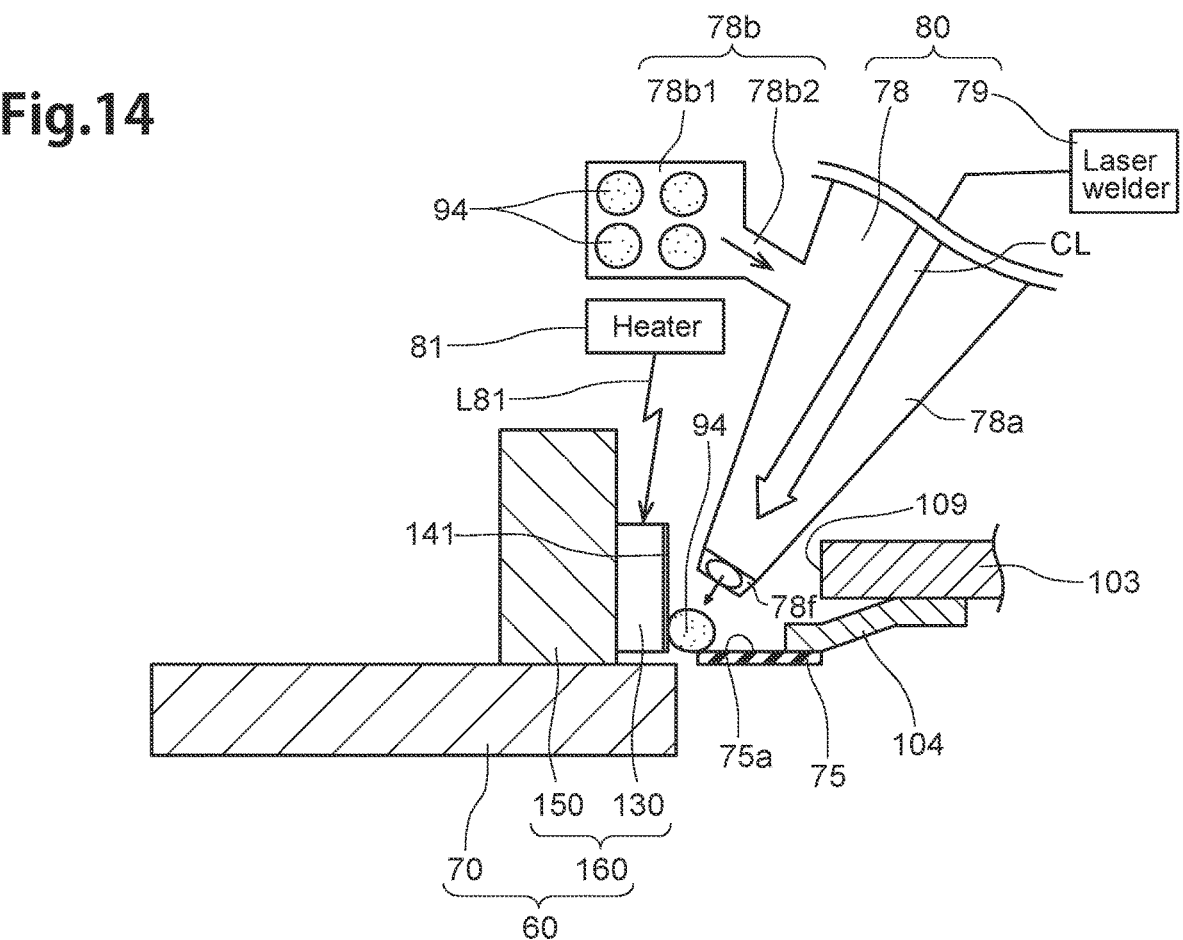
FIG. 14 is a sectional view showing a solder ball arrangement step and a heat step of the method of manufacturing, according to the embodiment of the present invention.
Figure 15:
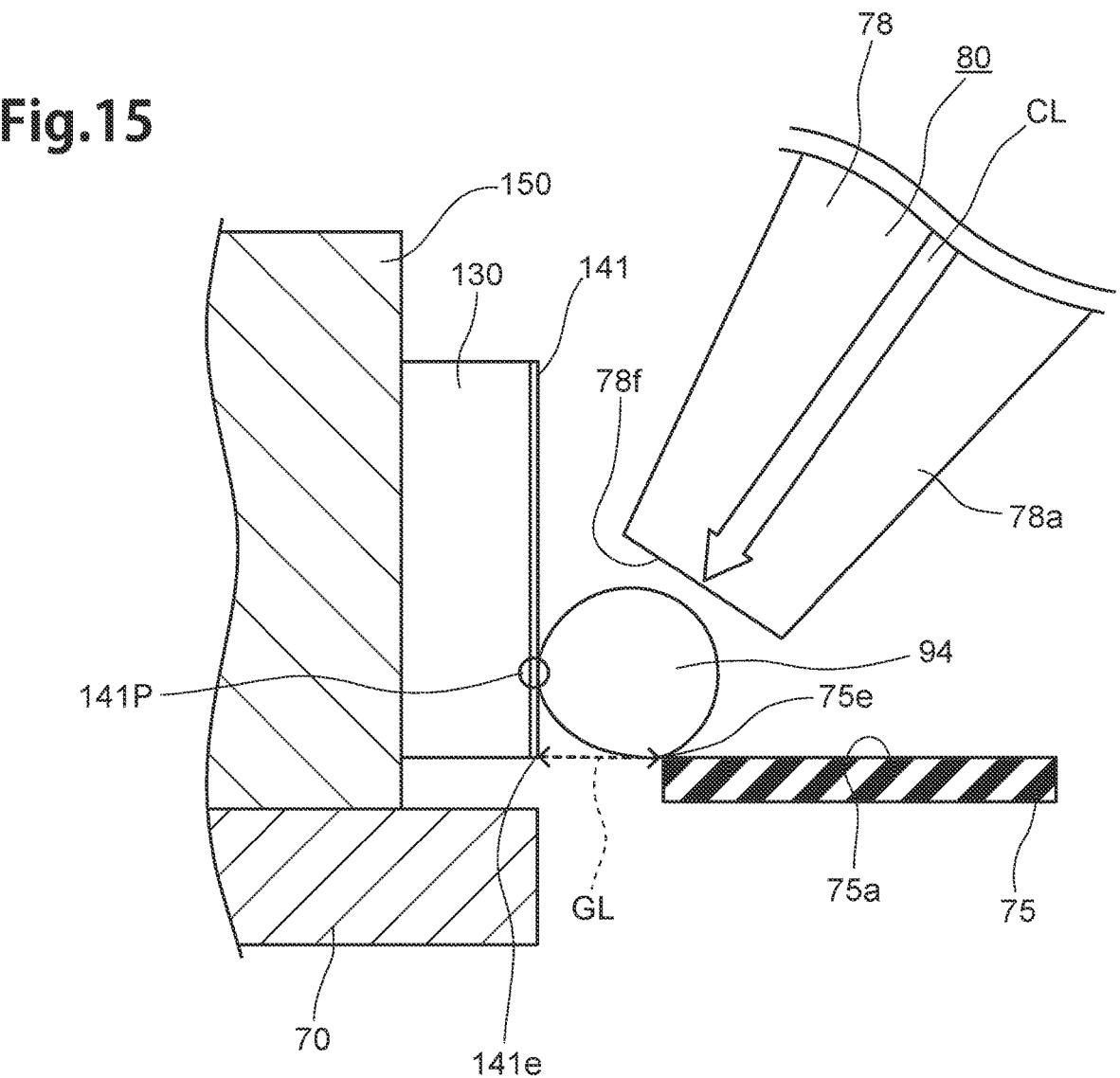
FIG. 15 is a sectional view showing the connecting ball attaching step subsequent to the solder ball arrangement step in FIG. 14.
Figure 16:
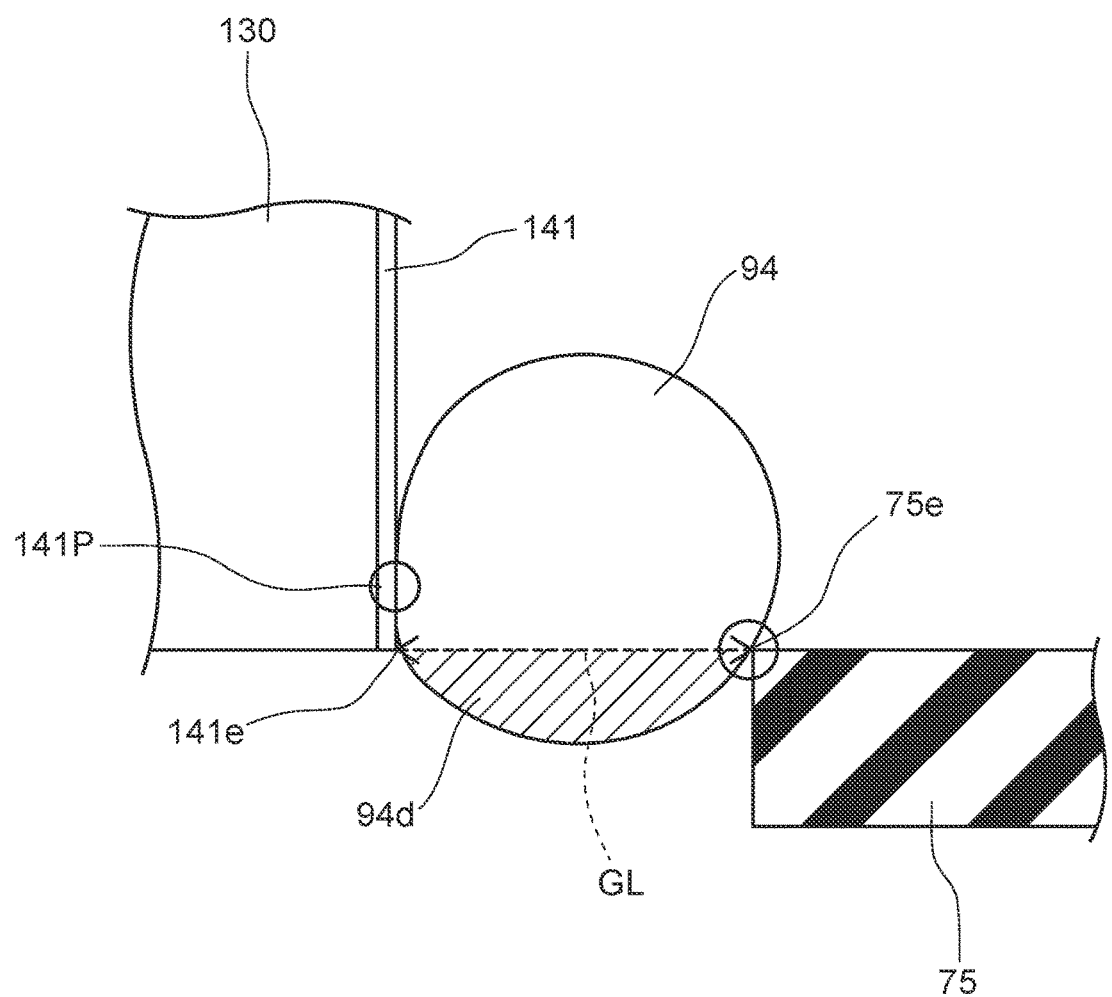
FIG. 16 is a sectional view, with enlargement, showing the principal part in FIG. 10(A)
Figure 17:
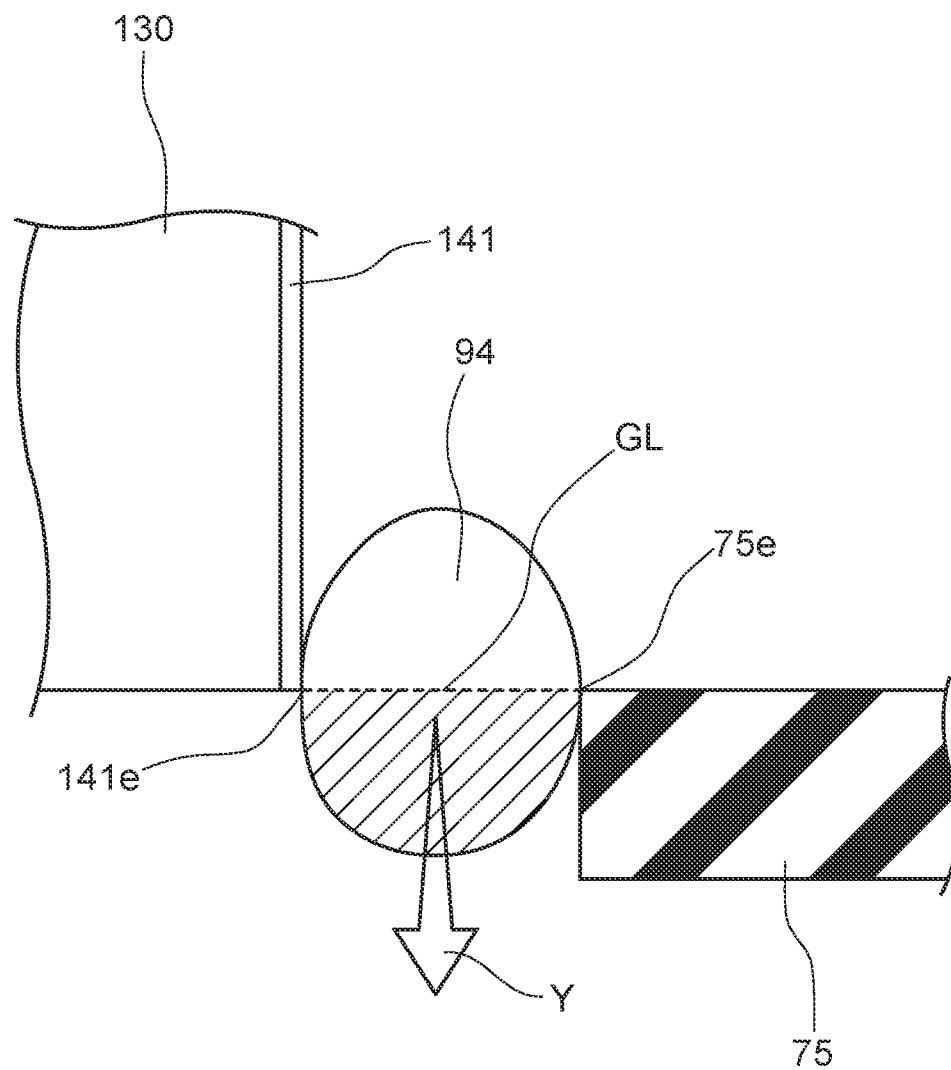
FIG. 17 is a sectional view schematically showing the HGA when the connecting ball attaching step is performed to modify the connecting ball.
Figure 18:
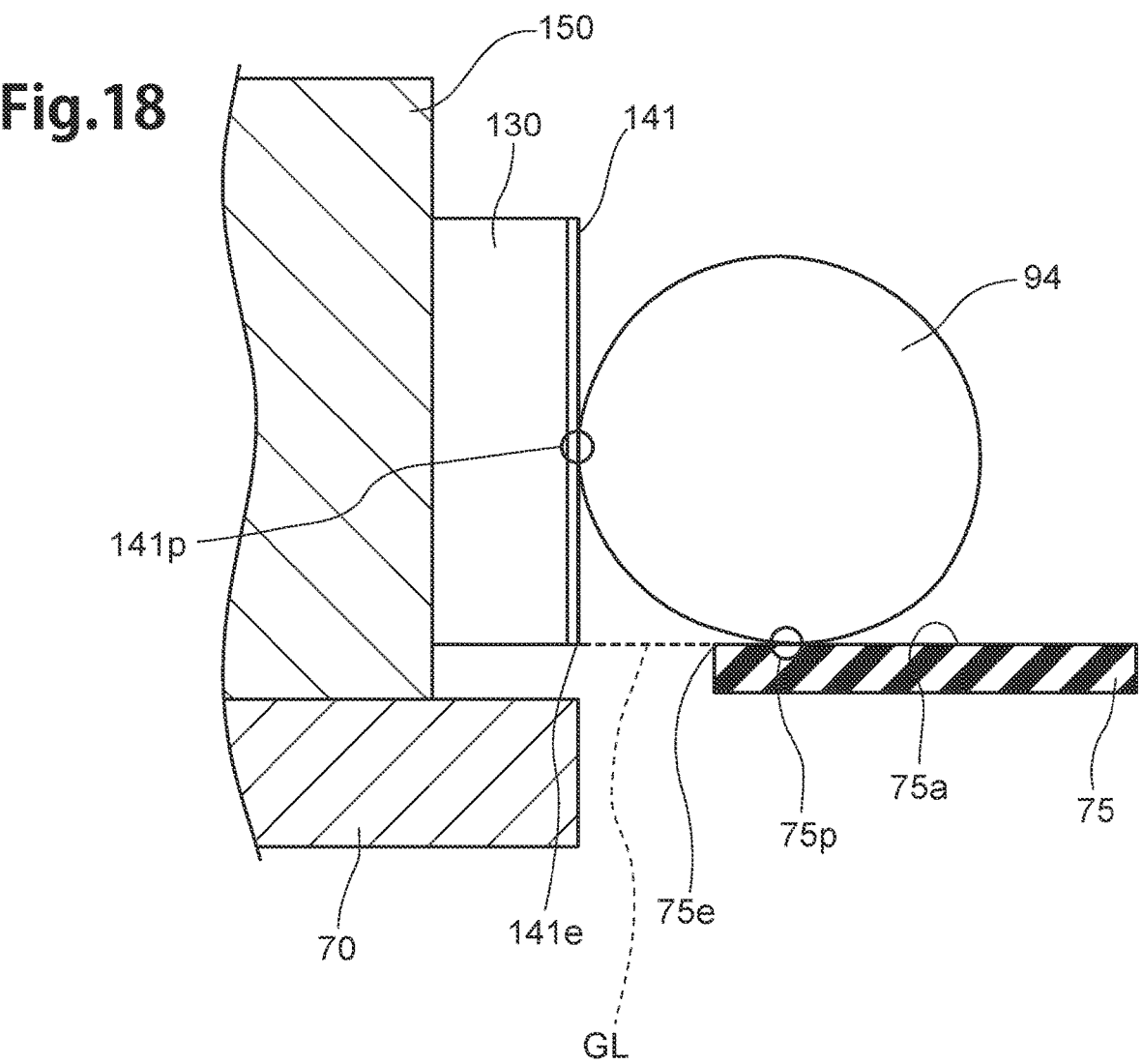
FIG. 18 is a sectional view showing a principal part, when the solder ball arrangement step is performed with the connecting ball having the size different from the case in FIG. 11.

Subsequently, the method of manufacturing the HGA 101, according to the embodiment of the present invention will be explained with reference to FIG. 10 to FIG. 17. FIG. 10 to FIG. 11 are sectional views showing a solder ball arrangement step of the method of manufacturing according to the embodiment of the present invention. FIG. 12 to FIG. 13 are sectional views showing a principal part when a connecting ball attaching step is performed, and the connecting ball is melted. FIG. 14 is a sectional view showing the solder ball arrangement step and a heat step, FIG. 15 is a sectional view showing the connecting ball attaching step subsequent to the step in FIG. 14. FIG. 16 is a sectional view, with enlargement, showing the principal part in FIG. 10(A). FIG. 17 is a sectional view schematically showing the HGA when the connecting ball attaching step is performed to modify the connecting ball.

The method of manufacturing, according to the present invention, includes a head connecting step. In the head connecting step, the above-described thermally assisted magnetic head 60 is connected to the suspension 50. The solder ball arrangement step and the connecting ball attaching step are included in the head connecting step. The method of manufacturing, according to the present invention, is characterized by the solder ball arrangement step and the connecting ball attaching step. Further, the heat step is included in the head connecting step. The present invention is also characterized in that the heat step is performed as a preliminary heat step.

Then, in the solder ball arrangement step, only one solder ball is arranged so that the laser diode 130 is connected to the flexure 106 for the above-described assembly structure. In the method of manufacturing according to the embodiment of the present invention, the later-described connecting ball 94 is used in the solder ball arrangement step. As illustrated in FIG. 10(A), when the solder ball arrangement step is performed, the connecting ball 94 is arranged so that the connecting ball 94 is in contact with an electrode surface of the laser diode 130 (n-electrode 141) and the flexure 106 (wiring member 75).

Because only one connecting ball 94 is used, in the method of manufacturing according to embodiment, the method of manufacturing according to the embodiment is also called "1-ball method".

The connecting ball 94 is a solder ball, having the size, which is slightly larger than a later-described wiring gap G2 (see FIG. 10(A)), and it is in an unmelted-solid condition.

In the present invention, the unmelted-solid condition means condition which solder is in unmelted condition (is not melting) and it has a constant form which is in solid condition. The connecting ball 94 is a minute granule like member, made of unmelted solder, and it has a ball like form. As illustrated in FIG. 10(A), the wiring gap G2 is the distance between the electrode surface of the laser diode 130 (n-electrode 141) and a part, of the wiring member 75, which is nearest to the n-electrode 141 (wiring end part 75e).

In FIG. 10(A), the connecting point 141P of the n-electrode 141 is set in a position which is away from an electrode end part 141e (see FIG. 10(B), later-described in detail) of the n-electrode 141. Therefore, the wiring gap G2, illustrated in FIG. 10(A), is larger than the length of the later-described gap line GL. As the connecting point 141P leaves from the electrode end part 141e, the wiring gap G2 is enlarged. When the connecting point 141P corresponds to the electrode end part 141e, the wiring gap G2 corresponds to the length of the gap line GL. At this time, the wiring gap G2 has a smallest size. The connecting point 141P is corresponding to the part, of the n-electrode 141, which the connecting ball 94 is connected.

As illustrated in FIG. 10(B), the electrode end part 141e is corresponding to the part, of the n-electrode 141, which is nearest to the wiring end part 75e. A suppositional line to connect the electrode end part 141e with the wiring end part 75e is the gap line GL. The gap line GL is formed in a narrowest part between the n-electrode 141 and the wiring member 75. The length of the gap line GL is corresponding to the shortest length between the n-electrode 141 and the wiring member 75 (wiring end part 75e).

Then, as illustrated in FIG. 10(A), FIG. 16, when the connecting point 141P is in the comparatively near position of the electrode end part 141e, the connecting ball 94 is arranged so as to be sandwiched with the n-electrode 141 and the wiring end part 75e. Then, a part of the connecting ball 94 is arranged in a position which is away from the n-electrode 141 than the gap line GL. At this time, the part of the connecting ball 94 becomes a bulging out part 94d. The bulging out part 94d is the part which is away from the n-electrode 141 than the gap line GL. In FIG. 16, hatching is shown in the bulging out part 94d. In this case, because the size of the connecting ball 94 is slightly larger than the wiring gap G2, the connecting ball 94 is kept by the n-electrode 141 and the wiring end part 75e.

However, when the connecting ball attaching step is performed afterward, thereby the connecting ball 94 melts, the form of the connecting ball 94 changes from a ball-like form. For example, as illustrated in FIG. 17, when the connecting ball 94 melts, the connecting ball 94 moves along with the direction Y, being affected by gravity, thereby the width, which is along with the gap line GL, is narrowed. As the result, more part of the connecting ball 94 gets over the gap line GL, thereby the bulging out part 94d is enlarged. Then, the connecting ball 94 is not likely to be attached appropriately to the n-electrode 141 and the wiring member 75 (wiring end part 75e).

Therefore, in the solder ball arrangement step, as illustrated in FIG. 11, it is preferable that the whole of the connecting ball 94 is arranged in the position which is near the n-electrode 141 than the gap line GL. Thereby, the connecting ball 94 is stopped on the wiring end part 75e, the connecting ball 94 is able to be surely attached to both the n-electrode 141 and the wiring member 75 (wiring end part 75e). To make this possible, it is preferable that the size of the connecting ball 94 is set in the size which is comparatively larger than the wiring gap G2, and the connecting point 141P is set in the position which is away from the electrode end part 141e than the case in FIG. 10(A).

In case of the method of manufacturing according to embodiment, the heat step is included in the head connecting step. In the heat step, the electrode surface of the laser diode 130 (n-electrode 141) is heated. For example, as illustrated in FIG. 14, laser light L81 is irradiated to the laser diode 130 from a heater 81 with a fiber laser, thereby the electrode surface (n-electrode 141) is heated. The temperature of the n-electrode 141 rises from normal temperature, by performing the heat step.

Then, after the connecting ball 94 is in contact with the n-electrode 141, the temperature of the connecting ball 94 rises from normal temperature. The temperature of the connecting ball 94 rises to a temperature which is higher than normal temperature and is lower than a melting temperature of solder (the temperature is also referred to "middle temperature", according to this embodiment), by the above temperature rise. The heat step is performed as the preliminary heat step.

Namely, the heat step is performed preliminarily to performing the solder ball arrangement step so that the connecting ball 94 is heated by the contact with the n-electrode 141. The preliminary heat step is performed, thereby the n-electrode 141 is preliminarily heated before the connecting ball 94 is in contact with the n-electrode 141.

The connecting ball attaching step is performed subsequent to the solder ball arrangement step. The connecting ball attaching step is performed so that the connecting ball 94 is attached to the wiring end part 75e in addition to the n-electrode 141 and the exposed wiring surface 75a.

As illustrated in FIG. 14, a jetting apparatus 80 is used in both the connecting ball attaching step and the above-described solder ball arrangement step, according to this embodiment. The jetting apparatus 80 includes a supply apparatus 78 and a laser welder 79. The supply apparatus 78 includes a capillary 78a and a solder ball supply part 78b. The capillary 78a is a hollow member which is formed gradually narrow toward an edge part 78f. The capillary 78a jets out the connecting ball 94 from the edge part 78f, thereby the connecting ball 94 is in contact with the n-electrode 141 and the wiring end part 75e. The solder ball supply part 78b is provided in the middle of the capillary 78a.

The solder ball supply part 78b includes a ball accommodating part 78b1 which the connecting balls 94 are accommodated, and a pipe 78b2 which connects the ball accommodating part 78b1 with the capillary 78a.

The laser welder 79 generates laser light CL (for example, continuous wave laser light), and it supplies the laser light CL to the connecting ball 94 via the capillary 78a of the supply apparatus 78.

Then, as also illustrated in FIG. 15, in the method of manufacturing, according to the embodiment, the following processes A1, A2 are performed in the order of A1, A2.

Processes A1 In the solder ball arrangement step, at first, the connecting ball 94 is supplied from the solder ball supply part 78b to the capillary 78a and the capillary 78a jets out the connecting ball 94 from the edge part 78f, thereby the connecting ball 94 is in contact with the n-electrode 141 and wiring end part 75e.

Processes A2 In the connecting ball attaching step, the laser light CL is supplied from the laser welder 79, and the laser light CL is irradiated to the connecting ball 94.

In the processes A2, the connecting ball 94 is heated by the irradiation of the laser light CL. On this point, in the embodiment, the preliminary heat step is performed. Therefore, the temperature of the connecting ball 94 preliminarily rises from the normal temperature to the middle temperature before the irradiation of the laser light CL. Then, it is sufficient that energy, which needs rising the temperature of the connecting ball 94 from the middle temperature to the melting temperature ('E1', not illustrated), is supplied by the laser light CL, for melting the connecting ball 94. Therefore, it is possible that the laser light CL is irradiated with the energy 'E1', which is lowered than the energy ('E2', not illustrated), the energy 'E2' is energy which needs rising the temperature of the connecting ball 94 from the normal temperature to the melting temperature (E1<E2). When the temperature of the connecting ball 94 rises from the middle temperature to the melting temperature with receiving the laser light CL, the connecting ball 94 melts.

Then, as illustrated in FIG. 12, because the part, of the connecting ball 94, which is in contact with the n-electrode 141 melts earlier, the connecting ball 94 gradually spreads outside from the connecting point 141p. After that, as illustrated in FIG. 13, the whole of the connecting ball 94 including the part being in contact with the wiring member 75 melts, thereby the connecting ball 94 gradually spreads from wiring end part 75e. Thereby the solder connector 199 is formed.

(Operation and Effect of the Head Gimbal Assembly 101)

As described above, the HGA 101 has the solder connector 199, the solder connector 199 connects the n-electrode 141 with the wiring member 75.

Then, the solder connector 199 is formed when the HGA 101 is manufactured in accordance with the method of manufacturing according to the embodiment of the present invention. The method of manufacturing includes the solder ball arrangement step, the connecting ball attaching step and the preliminary heat step.

In the solder ball arrangement step, the connecting ball 94 is arranged so that the connecting ball 94 is in contact with the n-electrode 141 and the wiring end part 75e. After the connecting ball 94 is in contact with the n-electrode 141 and the wiring end part 75e by the solder ball arrangement step, the connecting ball attaching step is performed. Thereby, the connecting ball 94 is attached to the n-electrode 141 and the wiring member 75.

Then in the above-described embodiment, the preliminary heat step is performed before performing the solder ball arrangement step. Therefore, the temperature of the connecting ball 94 preliminarily rises from the normal temperature to the middle temperature before the irradiation of the laser light CL. Thereby, it is possible that the laser light CL is irradiated with the energy 'E1', which is lowered than the energy ('E2'), the energy 'E2' is energy which needs rising the temperature of the connecting ball 94 from the normal temperature to the melting temperature. When, the connecting ball 94 melts because of irradiation of the laser light CL, the form of the connecting ball 94 gradually changes from the form like a ball.

On this point, it is possible that the connecting ball 94 melts without performing the preliminary heat step.

However, in case of the above, the laser light CL is needed for rising the temperature of the connecting ball 94 from the normal temperature to the melting temperature. Therefore, the connecting ball 94 receives large energy instantaneously, the connecting ball 94 melts instantaneously at the timing. Then, because solder, which constitutes the connecting ball 94, melts instantaneously, change of the form of the connecting ball 94 occurs instantaneously. When the connecting ball 94 melts, surface tension occurs. Because the melted connecting ball 94 tries to make surface area as small as possible because of the surface tension, the melted connecting ball 94 tries to pull the n-electrode 141, the exposed wiring surface 75a in the parts which the melted connecting ball 94 is in contact with the n-electrode 141, the exposed wiring surface 75a. Therefore, stress, which tries to against the surface tension, occurs in the n-electrode 141, the exposed wiring surface 75a. After the connecting ball 94 hardens, the stress remains in the connected parts of the connecting ball 94 and the n-electrode 141, the exposed wiring surface 75a, as mechanical stress. Therefore, it is difficult that the stability of the connection condition is improved.

At this point, in the conventional technology, because solder is attached to the whole of the electrode pads, when solder is attached, solder is attached to comparatively wide parts. Therefore, parts, being affected from surface tension, exist widely, thereby large mechanical stress remains in the HGA. Therefore, it is difficult that the stability of the connection condition is improved in the conventional HGA.

To the contrary, in the HGA 101, as described-above, the connecting ball 94 is in unmelted-solid condition at the timing of being arranged though, the temperature of the connecting ball 94 rises from the middle temperature to the melting temperature by receiving the laser light CL, then the connecting ball 94 gradually melts. Then, the form of the connecting ball 94 gradually changes, thereby the connecting ball 94 is attached to the n-electrode 141 and the exposed wiring surface 75a.

Therefore, because change of surface tension of the connecting ball 94 becomes slow by irradiation of the laser light CL, stress, which remains in the connecting part of the connecting ball 94 and the n-electrode 141, the exposed wiring surface 75a, becomes small. As the result, mechanical stress, which remains in the connecting part of the connecting ball 94 and the n-electrode 141, the exposed wiring surface 75a, becomes small. Therefore, it is possible that the stability of the connection condition is improved in the HGA 101.

Especially, mechanical stress, of the n-electrode 141, the exposed wiring surface 75a, being affected by surface tension of the connecting ball 94, becomes small, thereby a failure such as peel-off or lift-up of the electrode 141, the exposed wiring surface 75a is prevented. When the connecting ball 94 hardens, the temperature of the connecting ball 94 once falls to the middle temperature. Therefore, the cooling step (profile) is able to be controlled in addition to the heating step (profile).

Further, the solder connector 199 is formed by performing the connecting ball attaching step. Before that, when the solder ball arrangement step is performed, the connecting ball 94 is in contact with the n-electrode 141 and the wiring end part 75e. Therefore, the n-electrode 141 is connected with the wiring end part 75e by the connecting ball 94. However, the connecting ball 94 is in contact with the n-electrode 141 and the wiring end part 75e though, because the connecting ball 94 is not attached to the n-electrode 141 and the wiring end part 75e, the connecting condition is unstable.

Then, the connecting ball attaching step is performed, thereby, the solder connector 199 is formed so that the connecting ball 94 is attached to the n-electrode 141 and the wiring end part 75e, the exposed wiring surface 75a. Thereby, it is possible that the stability of the connection condition is improved.

Accordingly, it is possible that the stability of the connection condition is improved in the HGA 101, which is manufactured in accordance with the method of manufacturing according to the embodiment of the present invention.

Further, as illustrated in FIG. 11, it is preferable that the whole of the connecting ball 94 is arranged in the position which is near the n-electrode 141 than the gap line GL. Thereby, because the connecting ball 94 is able to be surely attached to both the n-electrode 141 and the wiring end part 75e, it is possible that the reliability of the connection condition is improved in addition to the stability of the connection condition.

(Modified Example)

Further, as illustrated in FIG. 17, it is possible that size of the connecting ball 94 is larger than the case in FIG. 10(A). By this, the connecting ball 94 is not in contact with the wiring end part 75e though, the connecting ball 94 is in contact with the exposed wiring surface 75a. Therefore, it is possible that the connecting ball 94 is in contact with the n-electrode 141 and the exposed wiring surface 75a.

(Embodiments of Hard Disk Drive)

Next, embodiments of the hard disk drive will be explained with reference to FIG. 19.

Figure 19:
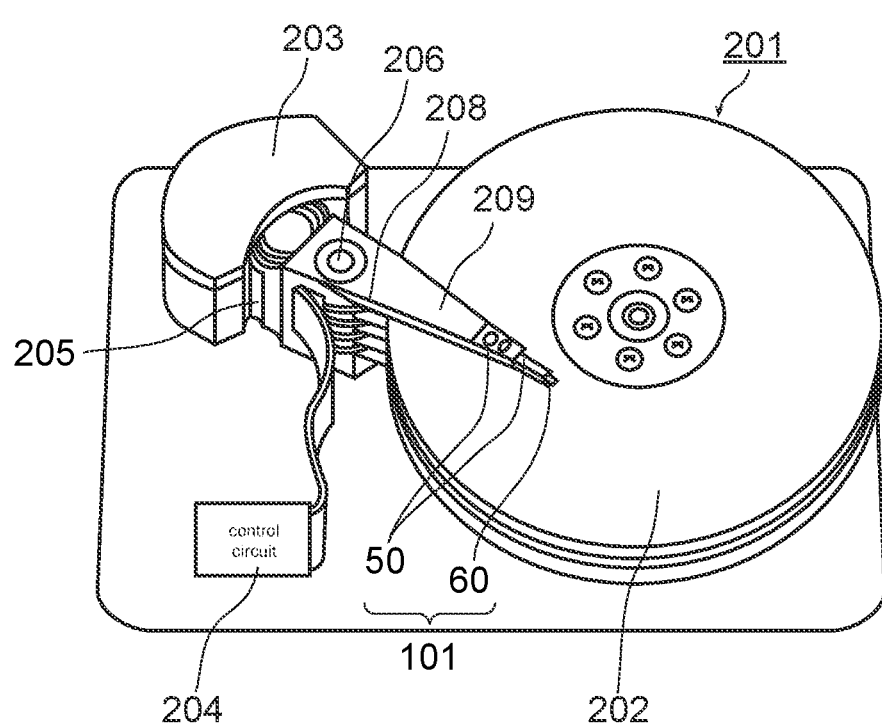
FIG. 19 is a perspective view showing a hard disk drive including the HGA in FIG. 1.
Figure 20:
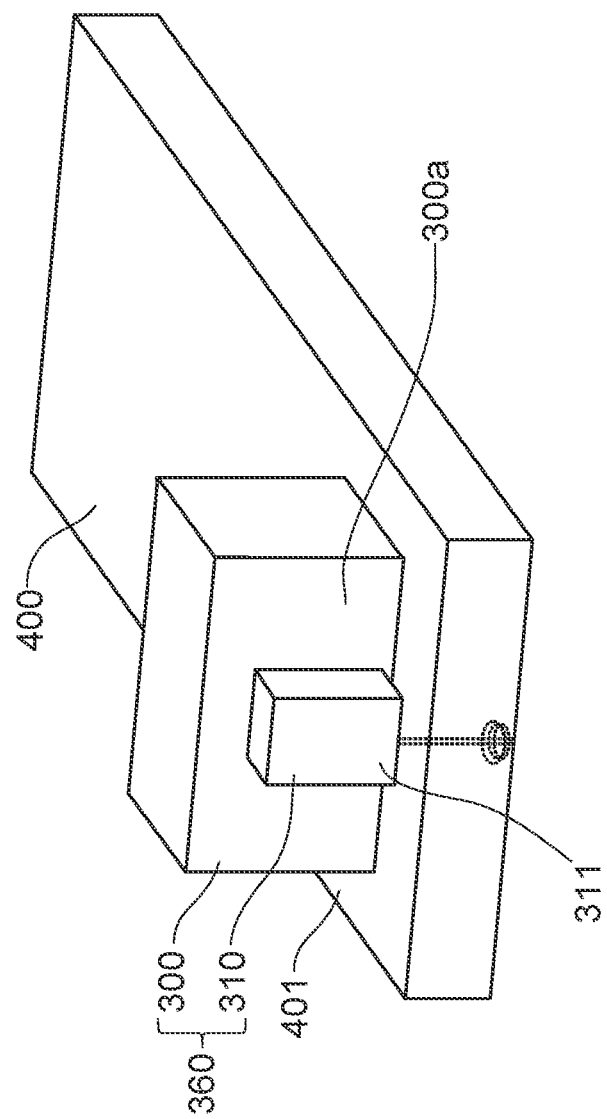
FIG. 20 is a perspective view showing a conventional thermally assisted magnetic head.
Figure 21:
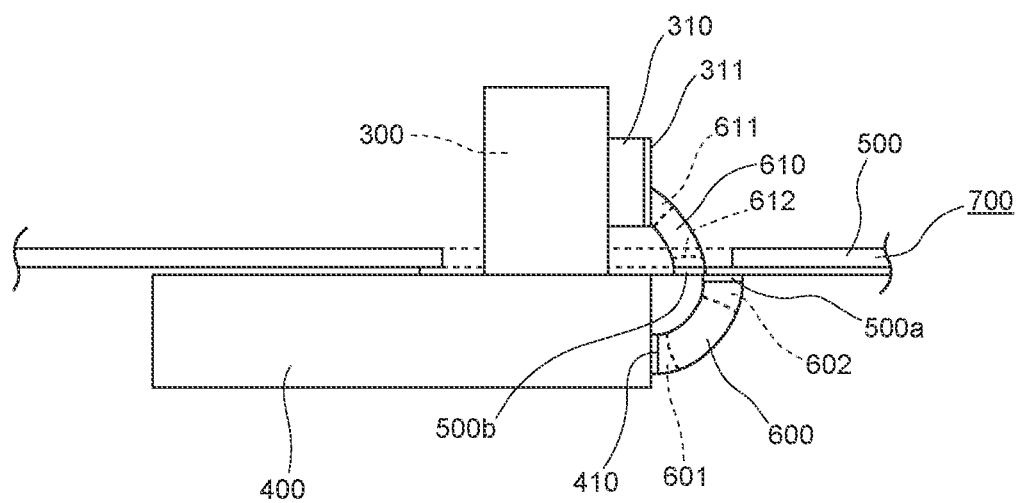
FIG. 21 is a side view, partly omitted, illustrating a principal part of the conventional HGA.

FIG. 19 is a perspective view showing a hard disk drive 201 equipped with the HGA 101 having the above-described thermally assisted magnetic head 60. The hard disk drive 201 includes a hard disk (magnetic recording medium) 202, rotating at a high speed, and the above-described head gimbal assembly (HGA) 101. The hard disk drive 201 is an apparatus which actuates the HGA 101, so as to record/reproduce data onto/from recording surfaces of the hard disk 202. The hard disk 202 has a plurality of (4 in the drawing) platters. Each platter has a recording surface opposing its corresponding the thermally assisted magnetic head 60.

The hard disk drive 201 positions the slider 70 on a track by an assembly carriage device 203. Further, the hard disk drive 201 has a plurality of drive arms 209. The drive arms 209 pivot about a pivot bearing shaft 206 by means of a voice coil motor (VCM) 205, and are stacked in a direction along the pivot bearing shaft 206. Further, the HGA 101 is attached to the tip of each drive arm 209.

Further, the hard disk drive 201 has a control circuit 204 controlling recording/reproducing and the generation of light by the laser diode 130.

In the hard disk drive 201, when the HGA 101 is rotated, the thermally assisted magnetic head 60 moves in a radial direction of the hard disk 202, i.e., a direction traversing track lines.

The hard disk drive 201 has the HGA 101, thereby mechanical stress, caused by the connection with solder, is extremely lowered. Accordingly, concerning the hard disk drive 201, it is possible that the stability of the connection condition is improved in the HGA 101.

Though the above-mentioned embodiments explain a type in which a thin-film coil is wound like a flat spiral about the recording magnetic layer by way of example, the present invention is also applicable to a type in which the thin-film coil is wound helically about the recording magnetic layer.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A method of manufacturing a head gimbal assembly having a thermally assisted magnetic head and a suspension comprising:

a head connecting step which the thermally assisted magnetic head is connected to the suspension;

wherein the thermally assisted magnetic head comprises a structure which a light-source unit, having a laser diode, is joined to a slider in which an electromagnetic element is formed;

wherein the suspension comprises an opening part which penetrates from a slider arrangement surface, which the slider is arranged, to a light-source unit surface, which the light-source unit is arranged, and a flexure which forms the slider arrangement surface;

wherein the head connecting step comprises a solder ball arrangement step which only one solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension;

wherein the solder ball arrangement step is performed using a connecting ball, as the solder ball, having a size larger than a wiring gap between an electrode surface of the laser diode and a wiring end part, of the flexure, which is closest to the electrode surface and being in unmelted-solid condition, and the solder ball arrangement step is performed so that the connecting ball is in contact with the electrode surface and the wiring end part of the flexure;

wherein the head connecting step comprises a heat step which the electrode surface is heated and a connecting ball attaching step which the connecting ball is attached to the electrode surface and the wiring end part of the flexure, after the connecting ball is in contact with the electrode surface and the wiring end part of the flexure;

wherein the connecting ball attaching step is performed so that the whole of the connecting ball is arranged in the position which is near the electrode surface and above a gap line which connects an electrode end part, of the electrode surface, being nearest to the wiring end part with the wiring end part.

2. The method of manufacturing a head gimbal assembly according to claim 1, wherein the heat step is performed as a preliminary heat step which only the electrode surface is preliminarily heated before performing the solder ball arrangement step so that the connecting ball is heated at the timing of being in contact with the electrode surface.

3. The method of manufacturing a head gimbal assembly according to claim 2, wherein the connecting ball attaching step is performed by irradiation of laser light to the connecting ball so that temperature of the connecting ball reaches a melting temperature of a solder from a middle temperature, which preliminarily reaches by heating of the connecting ball because of contact with the electrode surface.

4. The method of manufacturing a head gimbal assembly according to claim 3, wherein the solder ball arrangement step is performed so that the whole of the connecting ball is arranged in the position which is near the electrode surface than the gap line.

5. The method of manufacturing a head gimbal assembly according to claim 4, wherein the suspension comprises a load beam which forms the light-source unit surface;

wherein the flexure comprises a wiring member which forms the slider arrangement surface;

wherein the wiring member comprises an exposed wiring surface which is exposed in the opening part;

wherein the solder ball arrangement step is performed so that the connecting ball is in contact with the electrode surface and the wiring end part;

wherein the connecting ball attaching step is performed so that the connecting ball is attached to the wiring end part in addition to the electrode surface and the exposed wiring surface.

6. The method of manufacturing a head gimbal assembly according to claim 3, wherein the suspension comprises a load beam which forms the light-source unit surface;

wherein the flexure comprises a wiring member which forms the slider arrangement surface;

wherein the wiring member comprises an exposed wiring surface which is exposed in the opening part;

wherein the connecting ball attaching step is performed so that the connecting ball is attached to the electrode surface and the exposed wiring surface.

* * * * *